(12) United States Patent  (10) Patent No.: US 8,604,364 B2
Simon et al.  (45) Date of Patent: Dec. 10, 2013

(54) SENSORS, ALGORITHMS AND APPLICATIONS FOR A HIGH DIMENSIONAL TOUCHPAD

(75) Inventors: Steven H. Simon, Oakland, CA (US); Andrew D. Graham, San Francisco, CA (US)

(73) Assignee: Lester F. Ludwig, Belmont, CA (US)

( * ) Notice: Subject to any disclaimer, the term of this patent is extended or adjusted under 35 U.S.C. 154(b) by 633 days.

(21) Appl. No.: 12/541,948

(22) Filed: Aug. 15, 2009

(65) Prior Publication Data
US 2010/0044121 A1   Feb. 25, 2010

Related U.S. Application Data

(60) Provisional application No. 61/089,386, filed on Aug. 15, 2008.

(51) Int. Cl.
G06F 3/041 (2006.01)
(52) U.S. Cl.
USPC ....................................................... 178/18.03
(58) Field of Classification Search
None
See application file for complete search history.

(56) References Cited

U.S. PATENT DOCUMENTS

| | | | |
|---|---|---|---|
| 4,748,676 A | 5/1988 | Miyagawa | |
| 4,899,137 A | 2/1990 | Behrens et al. | |
| 5,237,647 A | 8/1993 | Roberts et al. | |
| 5,270,711 A | 12/1993 | Knapp | |
| 5,292,999 A | 3/1994 | Tumura | |
| 5,341,133 A | 8/1994 | Savoy | |
| 5,347,295 A | 9/1994 | Agulnick et al. | |
| 5,357,048 A | 10/1994 | Sgroi | |
| 5,378,850 A | 1/1995 | Tumura | |
| 5,386,219 A | 1/1995 | Greanias | |
| 5,420,936 A | 5/1995 | Fitzpatrick | |
| 5,440,072 A | 8/1995 | Willis | |
| 5,442,168 A | 8/1995 | Gurner et al. | |
| 5,459,282 A | 10/1995 | Willis | |
| 5,471,008 A | 11/1995 | Fujita et al. | |
| 5,475,214 A | 12/1995 | DeFranco et al. | |

(Continued)

FOREIGN PATENT DOCUMENTS

EP   0 574 213 A1   12/1993

OTHER PUBLICATIONS

Lberg, M. S., et al. "An Imprecise Mouse Gesture for the Fast Activation of Controls." IOS Press, Aug. 1999, http://www.csc.ncsu.edu/faculty/stamant/papers/interact.pdf.gz, last accessed Jul. 9, 2013.

(Continued)

*Primary Examiner* — Hoa T Nguyen
*Assistant Examiner* — Mark Fischer
(74) *Attorney, Agent, or Firm* — Procopio, Cory, Hargreaves & Savitch LLP

(57) ABSTRACT

A high dimensional touchpad (HDTP) controls a variety of computer windows systems and applications by detecting a user's finger movement in the left-right, forward-backward, roll, pitch, yaw, and downward pressure directions. Measurements obtained from the touchpad of at least two attributes of finger movement at two different time intervals are used to provide a first and a second finger position attribute used to control an application on an electronic device. The finger roll angle is determined by detecting the edge and the peak region of a finger contact area. Also, a visual color displayed in an application operating on an electronic device is controlled by a measured-angle value of a finger in contact with a touchpad.

7 Claims, 26 Drawing Sheets a. Rolled Left with Neutral Pitch b. Neutral Roll with Neutral Pitch

(56) References Cited

U.S. PATENT DOCUMENTS

| | | | |
|---|---|---|---|
| 5,565,641 A | 10/1996 | Gruenbaum | |
| 5,585,588 A | 12/1996 | Tumura | |
| 5,592,572 A | 1/1997 | Le | |
| 5,592,752 A | 1/1997 | Fu | |
| 5,659,145 A | 8/1997 | Weil | |
| 5,659,466 A | 8/1997 | Norris et al. | |
| 5,665,927 A | 9/1997 | Taki et al. | |
| 5,668,338 A | 9/1997 | Hewitt et al. | |
| 5,675,100 A | 10/1997 | Hewlett | |
| 5,717,939 A | 2/1998 | Bricklin et al. | |
| 5,719,347 A | 2/1998 | Masubuchi et al. | |
| 5,719,561 A | 2/1998 | Gonzales | |
| 5,724,985 A | 3/1998 | Snell | |
| 5,741,993 A | 4/1998 | Kushimiya | |
| 5,748,184 A | 5/1998 | Shieh | |
| 5,763,806 A | 6/1998 | Willis | |
| 5,786,540 A | 7/1998 | Westlund | |
| 5,801,340 A | 9/1998 | Peter | |
| 5,805,137 A | 9/1998 | Yasutake | |
| 5,824,930 A | 10/1998 | Ura et al. | |
| 5,827,989 A | 10/1998 | Fay et al. | |
| 5,841,428 A | 11/1998 | Jaeger et al. | |
| 5,850,051 A | 12/1998 | Machover et al. | |
| 5,852,251 A | 12/1998 | Su et al. | |
| 5,889,236 A | 3/1999 | Gillespie et al. | |
| 5,932,827 A | 8/1999 | Osborne et al. | |
| 5,969,283 A | 10/1999 | Looney et al. | |
| 5,977,466 A | 11/1999 | Muramatsu | |
| 5,986,224 A | 11/1999 | Kent | |
| 6,005,545 A | 12/1999 | Nishida et al. | |
| 6,037,937 A | 3/2000 | Beaton et al. | |
| 6,047,073 A | 4/2000 | Norris et al. | |
| 6,051,769 A | 4/2000 | Brown, Jr. | |
| 6,100,461 A | 8/2000 | Hewitt | |
| 6,107,997 A | 8/2000 | Ure | |
| 6,140,565 A | 10/2000 | Yamauchi et al. | |
| 6,204,441 B1 | 3/2001 | Asahi et al. | |
| 6,225,975 B1 | 5/2001 | Furuki et al. | |
| 6,285,358 B1 | 9/2001 | Roberts | |
| 6,288,317 B1 | 9/2001 | Willis | |
| 6,310,279 B1 | 10/2001 | Suzuki et al. | |
| 6,310,610 B1 | 10/2001 | Beaton et al. | |
| 6,320,112 B1 | 11/2001 | Lotze | |
| 6,323,846 B1 | 11/2001 | Westerman et al. | |
| 6,360,019 B1 | 3/2002 | Chaddha | |
| 6,363,159 B1 | 3/2002 | Rhoads | |
| 6,373,475 B1 | 4/2002 | Challis | |
| 6,392,636 B1 * | 5/2002 | Ferrari et al. | 345/173 |
| 6,392,705 B1 | 5/2002 | Chaddha | |
| 6,400,836 B2 | 6/2002 | Senior | |
| 6,404,898 B1 | 6/2002 | Rhoads | |
| 6,408,087 B1 | 6/2002 | Kramer | |
| 6,570,078 B2 | 5/2003 | Ludwig | |
| 6,703,552 B2 | 3/2004 | Haken | |
| 6,793,619 B2 | 9/2004 | Blumental | |
| 7,030,860 B1 | 4/2006 | Hsu et al. | |
| 7,408,108 B2 | 8/2008 | Ludwig | |
| 7,557,797 B2 | 7/2009 | Ludwig | |
| 7,598,949 B2 | 10/2009 | Han | |
| 7,611,409 B2 | 11/2009 | Muir et al. | |
| 8,154,529 B2 | 4/2012 | Sleeman | |
| 8,169,414 B2 * | 5/2012 | Lim | 345/173 |
| 8,170,346 B2 | 5/2012 | Ludwig | |
| 8,179,376 B2 | 5/2012 | Griffin | |
| 8,345,014 B2 | 1/2013 | Lim | |
| 2001/0036299 A1 * | 11/2001 | Senior | 382/124 |
| 2002/0005108 A1 | 1/2002 | Ludwig | |
| 2002/0093491 A1 | 7/2002 | Gillespie et al. | |
| 2004/0074379 A1 | 4/2004 | Ludwig | |
| 2004/0118268 A1 | 6/2004 | Ludwig | |
| 2004/0251402 A1 | 12/2004 | Reime | |
| 2006/0252530 A1 | 11/2006 | Oberberger et al. | |
| 2007/0044019 A1 | 2/2007 | Moon | |
| 2007/0063990 A1 | 3/2007 | Park | |
| 2007/0229477 A1 * | 10/2007 | Ludwig | 345/173 |
| 2008/0010616 A1 | 1/2008 | Algreatly | |
| 2008/0143690 A1 | 6/2008 | Jang | |
| 2008/0164076 A1 | 7/2008 | Orsley | |
| 2008/0259053 A1 | 10/2008 | Newton | |
| 2008/0297482 A1 | 12/2008 | Weiss | |
| 2008/0300055 A1 | 12/2008 | Lutnick | |
| 2008/0309634 A1 | 12/2008 | Hotelling et al. | |
| 2009/0006292 A1 | 1/2009 | Block | |
| 2009/0027351 A1 | 1/2009 | Zhang et al. | |
| 2009/0124348 A1 | 5/2009 | Yoseloff et al. | |
| 2009/0146968 A1 * | 6/2009 | Narita et al. | 345/173 |
| 2009/0167701 A1 | 7/2009 | Ronkainen | |
| 2009/0254869 A1 * | 10/2009 | Ludwig et al. | 715/863 |
| 2010/0013860 A1 | 1/2010 | Mandella | |
| 2010/0060607 A1 | 3/2010 | Ludwig | |
| 2010/0079385 A1 | 4/2010 | Holmgren | |
| 2010/0087241 A1 | 4/2010 | Nguyen et al. | |
| 2010/0090963 A1 | 4/2010 | Dubs | |
| 2010/0110025 A1 | 5/2010 | Lim | |
| 2010/0117978 A1 | 5/2010 | Shirado | |
| 2010/0177118 A1 | 7/2010 | Sytnikov | |
| 2010/0231612 A1 | 9/2010 | Chaudhri et al. | |
| 2010/0232710 A1 | 9/2010 | Ludwig | |
| 2010/0289754 A1 | 11/2010 | Sleeman et al. | |
| 2010/0302172 A1 | 12/2010 | Wilairat | |
| 2010/0328032 A1 | 12/2010 | Rofougaran | |
| 2011/0007000 A1 * | 1/2011 | Lim | 345/173 |
| 2011/0037735 A1 | 2/2011 | Land | |
| 2011/0063251 A1 | 3/2011 | Geaghan | |
| 2011/0086706 A1 | 4/2011 | Zalewski | |
| 2011/0202889 A1 | 8/2011 | Ludwig | |
| 2011/0202934 A1 | 8/2011 | Ludwig | |
| 2011/0260998 A1 | 10/2011 | Ludwig | |
| 2011/0261049 A1 | 10/2011 | Cardno | |
| 2011/0285648 A1 | 11/2011 | Simon et al. | |
| 2012/0007821 A1 | 1/2012 | Zaliva | |
| 2012/0034978 A1 | 2/2012 | Lim | |
| 2012/0056846 A1 | 3/2012 | Zaliva | |
| 2012/0108323 A1 | 5/2012 | Kelly et al. | |
| 2012/0192119 A1 | 7/2012 | Zaliva | |
| 2012/0194461 A1 | 8/2012 | Lim | |
| 2012/0194462 A1 | 8/2012 | Lim | |
| 2012/0195522 A1 | 8/2012 | Ludwig | |
| 2012/0223903 A1 | 9/2012 | Ludwig | |
| 2012/0235940 A1 | 9/2012 | Ludwig | |
| 2012/0262401 A1 | 10/2012 | Rofougaran | |
| 2012/0280927 A1 | 11/2012 | Ludwig | |
| 2012/0317521 A1 | 12/2012 | Ludwig | |
| 2013/0009896 A1 | 1/2013 | Zaliva | |
| 2013/0038554 A1 | 2/2013 | West | |

OTHER PUBLICATIONS

Moyle, M., et al. "A Flick in the Right Direction: A Case Study of Gestural Input." Conferences in Research and Practice in Information Technology, vol. 18, Jan. 2005; New Zealand, http://www.cosc.canterbury.ac.nz/andrew.cockburn/papers/moyle-cockburn.pdf, last accessed Jul. 9, 2013.

Maltoni, D., et al., "Handbook of Fingerprint Recognition," Springer Professional Computing, 2nd ed. 2009, XVI, p. 74, p. 361, http://books.google.com/books?id=1Wpx25D8q0wC&pg=PA361&lpg=PA361&dq=fingerprint+minutiae, last accessed Jul. 9, 2013.

"VeriFinger Information," http://www.fingerprint-it.com/_sol_verifinger.html, last accessed Jun. 11, 2013.

Prabhakar, S., et al., "Learning fingerprint minutiae location and type," http://www.cse.msu.edu/biometrics/Publications/Fingerprint/PrabhakarJainPankanti_MinaLocType_PR03.pdf, Pattern Recognition 36 (8), 1847-1857, last accessed Jun. 2, 2013.

Reyes, E. An Automatic Goodness Index to Measure Fingerprint Minutiae Quality, Progress in Pattern Recognition, Image Analysis and Applications, Lecture Notes in Computer Science vol. 3773, 2005, pp. 578-585, http://www.researchgate.net/publicaton/226946511_An_Automatic_Goodness_Index_to_Measure_Fingerprint_Minutiae_Quality/file/d912f50ba5e96320d5.pdf, last accessed Jun. 2, 2013.

Kayaoglu, M., et al., "Standard Fingerprint Databases: Manual Minutiae Labeling and Matcher Performance Analyses." arXiv

(56) References Cited

OTHER PUBLICATIONS preprint arXiv:1305.1443 (2013), http://arxiv.org/ftp/arxiv/papers/1305/1305.1443.pdf, last accessed Jun. 2, 2013.
Alonso-Fernandez, F., et al., "Fingerprint Recognition" Guide to Biometric Reference Systems and Performance Evaluation, (Springer London) pp. 51-90 (2009), http://www2.hh.se/staff/josef/publidpublications/alonso-fernandez09chapter.pdf, last accessed Jun. 2, 2013.
Wikipedia, "Image moment," http://en.wikipedia.org/wiki/Image_moment, Jul. 12, 2010, visited Feb. 28, 2011.
Hernandez-Leon, R., "Classifying using Specific Rules with High Confidence" Ninth Mexican International Conference on Artificial Intelligence Nov. 8-13, 2010, available through IEEE web site, http://ieeexplore.ieee.org/xpl/login.jsp?tp=&arnumber=5699163&url=http%3A%2F%2Fieeexplore.ieee.org%2Fxpls%2Fabs_all.jsp%3Farnumber%3D5699163, last retrieved Apr. 30, 2013.
Fang, F., et al., "Dynamics of a Winner-Take-All Neural Network" Neural Networks vol. 9, No. 7, pp. 1141-1154, Oct. 1996, http://www.fang.ece.ufl.edu/mypaper/nn96.pdf, last accessed Apr. 29, 2013.
Nguyen, N., et al., "Comparisons of sequence labeling algorithms and extensions," ACM Proceedings of the 24th International Conference on Machine Learning, pp. 681-688, 2007, http://www.cs.cornell.edu/~nhnguyen/icml07structured.pdf, last accessed Jun. 2, 2013.
Nissen, S., "Implementation of a Fast Artificial Neural Network Library (FANN)," Report, Department of Computer Science University of Copenhagen (DIKU)}, Oct. 31, 2003, http://mirrortransact.net.au/sourceforge/f/project/fa/fann/fann_doc/1.0/fann_doc_complete_1.0.pdf, last accessed Jun. 2, 2013.
Igel, C., et al., "Improving the Rprop learning algorithm," Proceedings of the Second International ICSC Symposium on Neural Computation (NC 2000), pp. 115-121, 2000, http://citeseemist.psu.edu/viewdoc/download?doi=10.1.1.17.3899&rep=rep1&type=pdf, last accessed Jun. 2, 2013.
Wikipedia, "Euler Angles," 2011, http://en.wikipedia.org/w/index.php?title=Euler_angles&oldid=436460926, Jun. 27, 2011 (accessed Jun. 30, 2011).
StatSoft, Inc., Electronic Statistics Textbook, 2011, http://www.statsoft.com/textbook, Jun. 22, 2011 (accessed Jul. 1, 2011).
Wikipedia, "Central Moment," 2009, http://en.wikipedia.org/w/index.php?title=Central_moment&oldid=332048374, Dec. 16, 2009, (accessed Oct. 26, 2010).
Wikipedia, "Local regression", 2011, http://en.wikipedia.org/w/index.php?title=Local_regression&oldid=416762287, Nov. 16, 2010 (accessed Jun. 28, 2011).
USPTO Notice of Allowance dated Jun. 6, 2013 issued in U.S. Appl. No. 13/846,830, filed Mar. 18, 2013.
Moog, R. A., The Human Finger—A Versatile Electronic Music Instrument Component, Audio Engineering Society Preprint, 1977, New York, NY, USA.
Johnson, C., "Image sensor tracks moving objects in hardware", Electronic Engineering Times, Apr. 5, 1999.
Kaoss pad dynamic effect/controller, Korg Preview Users' magazine Summer 1999.
Leiberman, D., Touch screens extend grasp Into consumer realm Electronic Engineering Times, Feb. 8, 1999.
Lim, et al., "A Fast Algorithm For Labelling Connected Components in Image Arrays", Technical Report Series, No. NA86-2, Thinking Machines Corp., 1986 (rev. 1987), Cambridge, Mass., USA.
Pennywitt, K., "Robotic Tactile Sensing," Byte, Jan. 1986.
Review of KORG X-230 Drum (later called Wave Drum), Electronic Musician, Apr. 1994.
Rich, R., "Buchla Lightning MIDI Controller", Electronic Musician, Oct. 1991.
Rich, R., "Buchla Thunder", Electronic Musician, Aug. 1990.
Dario P., et al., "Tactile sensors and the gripping challenge," IEEE Spectrum, vol. 5, No. 22, pp. 46-52, Aug. 1985.
Snell, J. M., "Sensors for Playing Computer Music with Expression", Proceedings of the Intl. Computer Music Conf. at Eastman, 1983.
Verner J. Artif Starr Switch Company Ztar 624-D, Electronic Musician, Nov. 1994.
Haken, L., "An Indiscrete Music Keyboard," Computer Music Journal, Spring 1998, pp. 30-48.
USPTO Notice of Allowance dated May 8, 2013 issued in U.S. Appl. No. 12/541,948, filed Aug. 15, 2009.
Buxton, W. A.S., "Two-Handed Document Navigation" http://www.billbuxton.com/2Hnavigation.html, dated Mar./Apr. 1994.
USPTO Notice of Allowance dated Mar. 20, 2012 issued in U.S. Appl. No. 12/724,413, filed Mar. 15, 2010.
USPTO Notice of Allowance dated Jan. 10, 2008 issued in U.S. Appl. No. 10/683,914, filed Oct. 10, 2003.
USPTO Notice of Allowance dated Nov. 9, 2012 issued in U.S. Appl. No. 12/502,230, filed Jul. 13, 2009.
USPTO Notice of Allowance dated Mar. 12, 2012 issued in U.S. Appl. No. 12/511,930, filed Jul. 29, 2009.
USPTO Notice of Allowance dated May 16, 2013 issued in U.S. Appl. No. 13/441,842, filed Apr. 7, 2012.
USPTO Notice of Allowance dated May 24, 2013 issued in U.S. Appl. No. 13/442,815, filed Apr. 9, 2012.
USPTO Notice of Allowance dated Dec. 24, 2002 issued in U.S. Appl. No. 09/812,870, filed Mar. 19, 2001.
"Otsu's method," http://en.wikipedia.org/wiki/Otsu_method, Sep. 13, 2010, visited Feb. 28, 2011.
"Principal component analysis," http://en.wikipedia.org/wiki/Principal_component_analysis, Feb. 25, 2011, visited Feb. 28, 2011.
USPTO Notice of Allowance dated May 30, 2013 issued in U.S. Appl. No. 13/442,806, filed Apr. 9, 2012.
Moto, "DIY Touchscreen Analysis," http://labs.moto.com/diy-touchscreen-analysis/, Jul. 15, 2010.
Wilson, T., "How the iPhone Works," http://electronics.howstuffworks.com/iphone2.htm, Jan. 8, 2011.
Walker, G., "Touch and the Apple iPhone," http://www.veritasetvisus.com/VVTP-12,%20Walker.pdf, Feb. 2007, viewed May 12, 2013.
Han, J., Multi-Touch Sensing through LED Matrix Displays (video), "http://cs.nyu.edu/~jhan/ledtouch/index.html," Feb. 18, 2011.
"Roberts Cross," http://en.wikipedia.org/wiki/Roberts_Cross, Jul. 20, 2010, visited Feb. 28, 2011.
"Sobel Operator," http://en.wikipedia.org/wiki/Sobel_operator, Mar. 12, 2010, visited Feb. 28, 2011.
"Prewitt," http://en.wikipedia.org/wiki/Prewitt, Mar. 15, 2010, visited Feb. 28, 2011.
"Coefficient of variation," http://en.wikipedia.org/wiki/Coefficient_of_variation, Feb. 15, 2010, visited Feb. 28, 2011.
"Canny edge detector," http://en.wikipedia.org/wiki/Canny_edge_detector, Mar. 5, 2010, visited Feb. 28, 2011.
"Polynomial regression," http://en.wikipedia.org/wiki/Polynomial_regression, Jul. 24, 2010, visited Feb. 28, 2011.
Pilu, M., et al., "Training PDMs on models: The Case of Deformable Superellipses," Proceedings of the 7th British Machine Vision Conference, Edinburgh, Scotland, 1996, pp. 373-382, https://docs.google.com/viewera=v&pid=explorer&chrome=true&srcid=0BxWzm3JBPnPmNDI1MDIxZGUtNGZhZi00NzJhLWFhZDMtNTJmYmRiMWYyMjBh&authkey=CPeVx4wO&hl=en, visited Feb. 28, 2011 and May 12, 2013.
Osian, M., et al., "Fitting Superellipses to Incomplete Contours," IEEE Computer Society Conference on Computer Vision and Pattern Recognition Workshops (CVPRW '04), Jun. 2004.
"Hough transform," http://en.wikipedia.org/wiki/Hough_transform, Feb. 13, 2010, visited Feb. 28, 2011.
"Tactile Pressure Measurement, Pressure Mapping Systems, and Force Sensors and Measurement Systems," http://www.tekscan.com, Feb. 3, 2011.
"Sensor Products LLC—Tactile Surface Pressure and Force Sensors," Oct. 26, 2006, http://www.sensorprod.com.
"Pressure Profile Systems," Jan. 29, 2011, http://www.pressureprofile.com.
"Xsensor Technology Corporation," Feb. 7, 2011, http://www.xsensor.com.
"Balda AG," Feb. 26, 2011, http://www.balda.de.
"Cypress Semiconductor," Feb. 28, 2011, http://www.cypress.com.
"Synaptics," Jan. 28, 2011, http://www.synaptics.com.

(56) References Cited

OTHER PUBLICATIONS

Venolia, D., et al., T-Cube: A Fast, Self-Disclosing Pen-Based Alphabet, CHI '94 Proceedings of the SIGCHI Conference on Human Factors in Computing Systems, pp. 265-270, Apr. 24-28, 1994.

Davis, R. C., et al., "NotePals: Lightweight Note Taking by the Group, for the Group," University of California, Berkeley, Computer Science Division, 1998.

Rekimoto, J., "Pick-and-Drop: A Direct Manipulation Technique for Multiple Computer Environments," Sony Computer Science Laboratory Inc., Tokyo, Japan, 1997, http://www.sonycsl.co.jp/person/rekimoto/papers/uist97.pdf, last retrieved on May 30, 2013.

Davis, R. C., et al., "NotePals: Lightweight Note Sharing by the Group, for the Group," http://dub.washington.edu:2007/projects/notepals/pubs/notepals-chi99-final.pdf, last retrieved Jun. 2, 2013.

Want, R., et al. "The PARCTAB ubiquitous computing experiment," (1995-1996) last accessed copy at http://www.ece.rutgers.edu/~parashar/Classes/02-03/ece572/perv-reading/the-parctab-ubiquitous-computing.pdf on Jun. 10, 2013.

\* cited by examiner

Partitioning

Sequencing

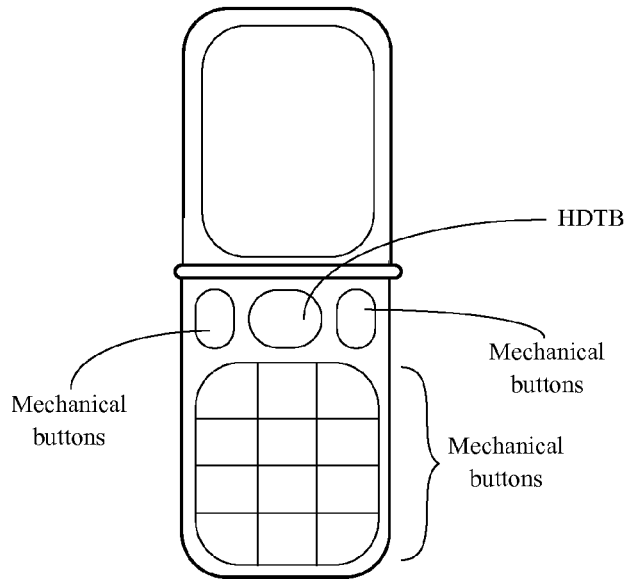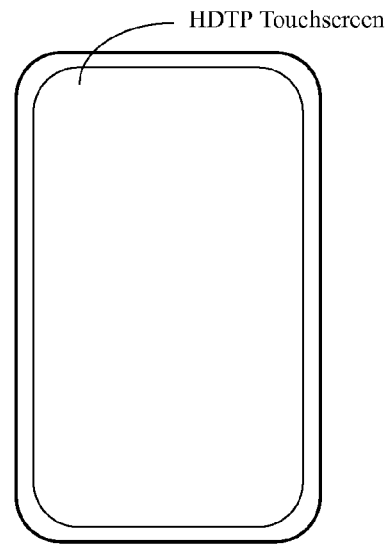
Fig. 7A              Fig. 7B
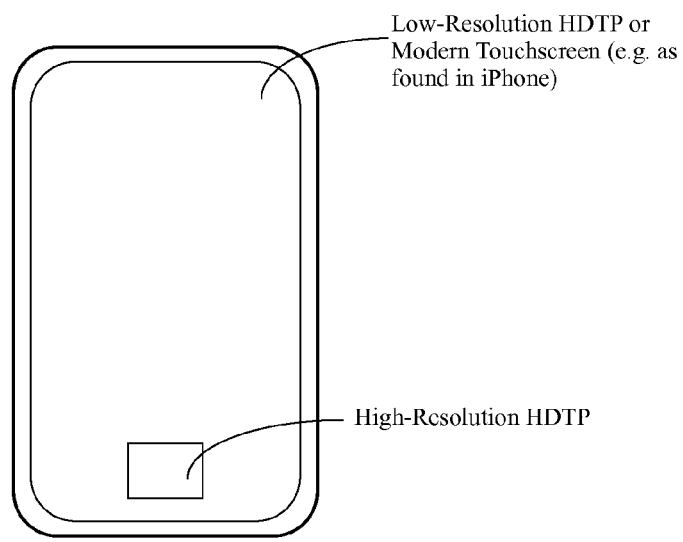
Fig. 7C

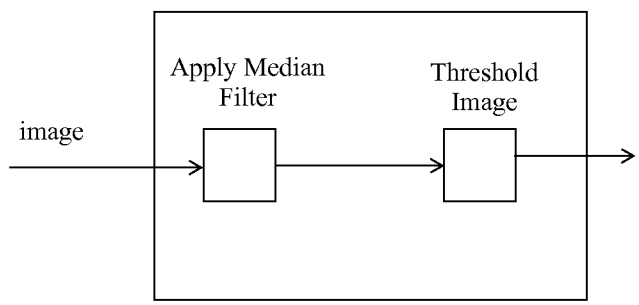
Fig. 9
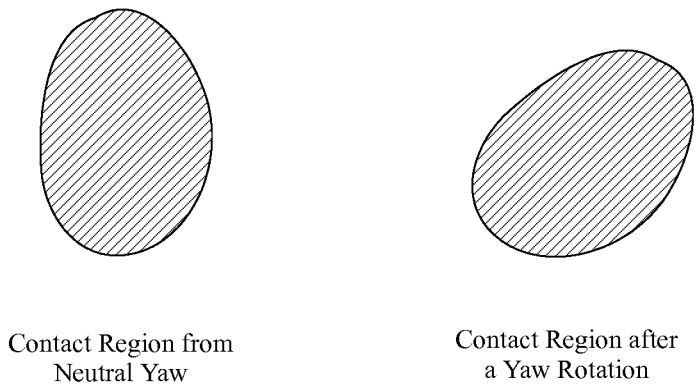
Contact Region from Neutral Yaw
Contact Region after a Yaw Rotation
Fig. 10A
Fig. 10B
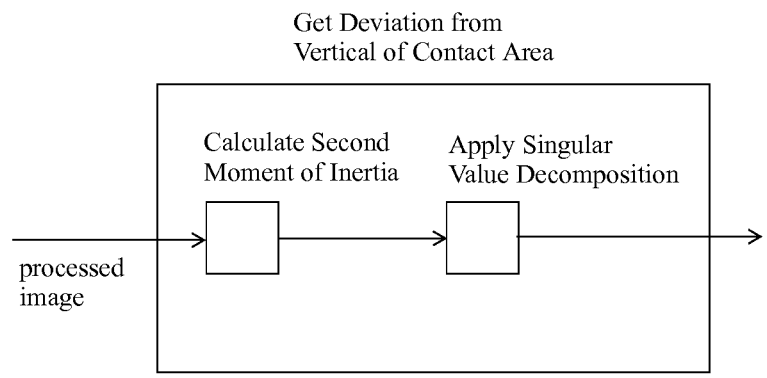
Fig. 11

```
typedef unsigned int uint;
typedef struct sum sum;
struct sum {
        double x; double y; double p; double xx; double xy; double yy;
};

int getmoi(int nx, int ny, float img[], double m2[])
{
        sum s;
        double m1[2];
        int n;

if (nx <= 0 || ny <= 0 || !img || !m2) return -1;
        n = getsums(nx, ny, img, &s);
        if (n <= 0) return n;
        m2[0] = s.xx;
        m2[1] = s.xy;
        m2[2] = s.xy;
        m2[3] = s.yy;
        m1[0] = s.x/n;
        m1[1] = s.y/n;
        m2[0] = m2[0]/n - m1[0]*m1[0];
        m2[1] = m2[1]/n - m1[0]*m1[1];
        m2[2] = m2[2]/n - m1[1]*m1[0];
        m2[3] = m2[3]/n - m1[1]*m1[1];
        return n;
}
static int getsums(int nx, int ny, float img[], sum *s)
{
        float p;
        int n, x, y;

if (nx <= 0 || ny <= 0 || !img || !s) return -1;
        n = 0;
        memset(s, 0, sizeof(sum));
        for (int i = 0; i < nx*ny; i++) {
                p = img[i];
                if (p < 0 || p > MAXPRES) return -1;
                if (!p)continue;
                n++;
                s->p += p;
                x = i % nx;
                y = i/nx;
                s->x  += x;
                s->y  += y;
                s->xx += x*x;
                s->xy += x*y;
                s->yy += y*y;
        }
        return n;
}
```

Fig. 12

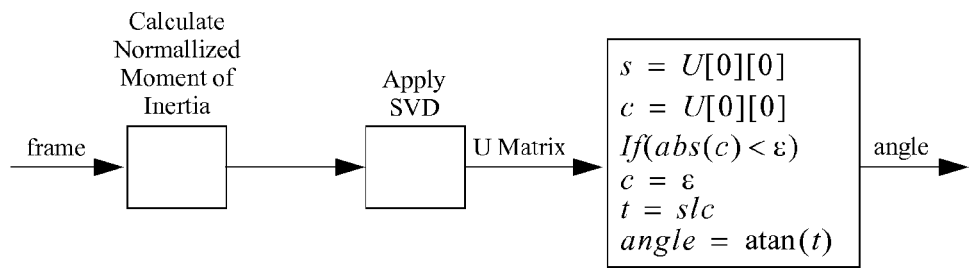
Fig. 13
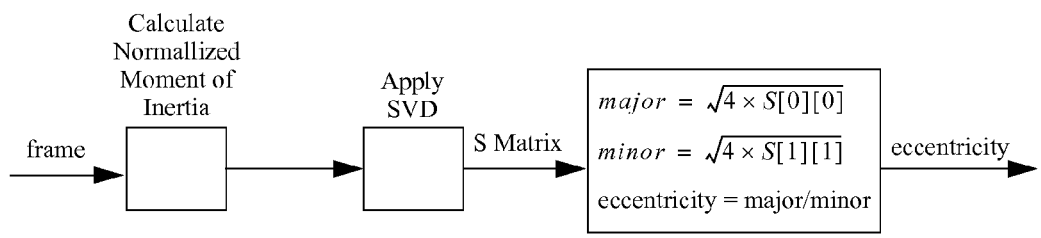
Fig. 14
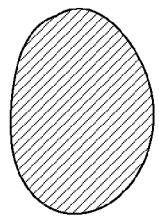 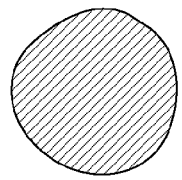 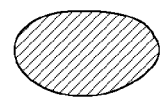
Essentially Elliptical Regions Produced by Finger when Pitched Back
Essentially Circular Region Produced by Finger Pitched Forward Part-way
Small Essentially Elliptical Regions Produced by Finger Pitched Far Forward
Fig. 15A  Fig. 15B  Fig. 15C

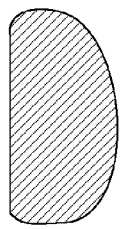

Rolled Left with
Neutral Pitch

Fig. 17A

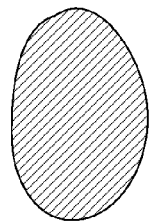

Neutral Roll
with Neutral Pitch

Fig. 17B

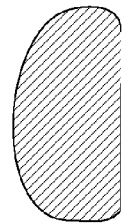

Rolled Right with
Neutral Pitch

Fig. 17C

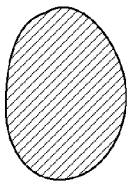

Rolled Left when
Pitched Forward

Fig. 18A

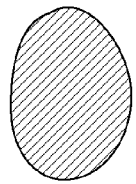

Neutral Roll When
Pitched Forward

Fig. 18B

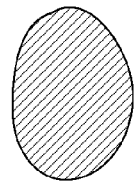

Rolled Right When
Pitched Forward

Fig. 18C

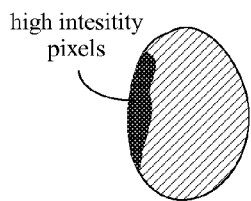

Rolled Left when
Pitched Forward

Fig. 19A

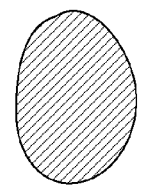

Neutral Roll When
Pitched Forward

Fig. 19B

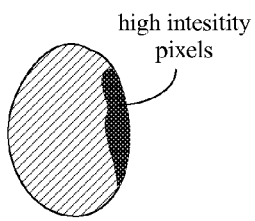

Rolled Right When
Pitched Forward

Fig. 19C

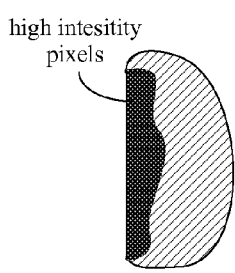

Rolled Left with
Neutral Pitch

Fig. 19D

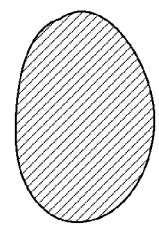

Neutral Roll
with Neutral Pitch

Fig. 19E

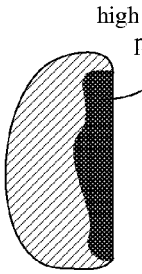

Rolled Right with
Neutral Pitch

Fig. 19F

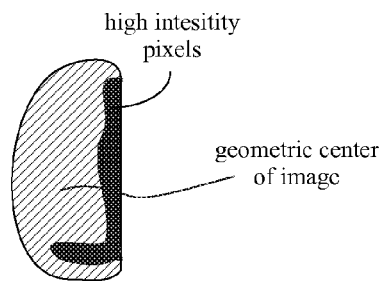
Fig. 20
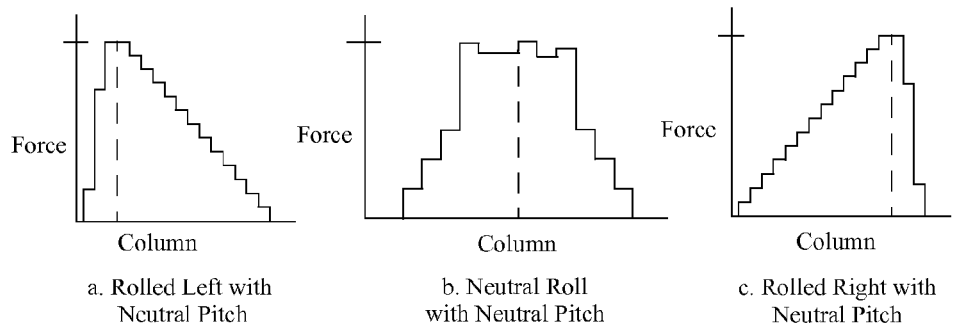
a. Rolled Left with Neutral Pitch
b. Neutral Roll with Neutral Pitch
c. Rolled Right with Neutral Pitch
Fig. 21A  Fig. 21B  Fig. 21C
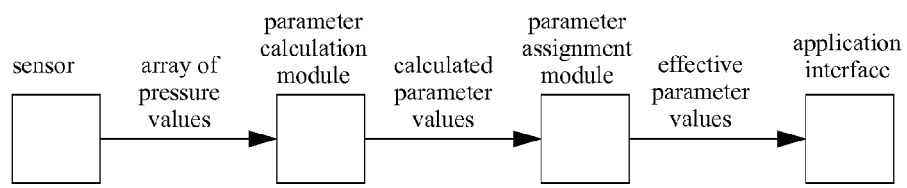
Fig. 22

Map Displayed With Finger in Neutral Position

Finger Rolls Left, Map Pans Left

Finger Pitches Back, Map Pans Down

Pressure applied by finger is reduced, map zoomed out

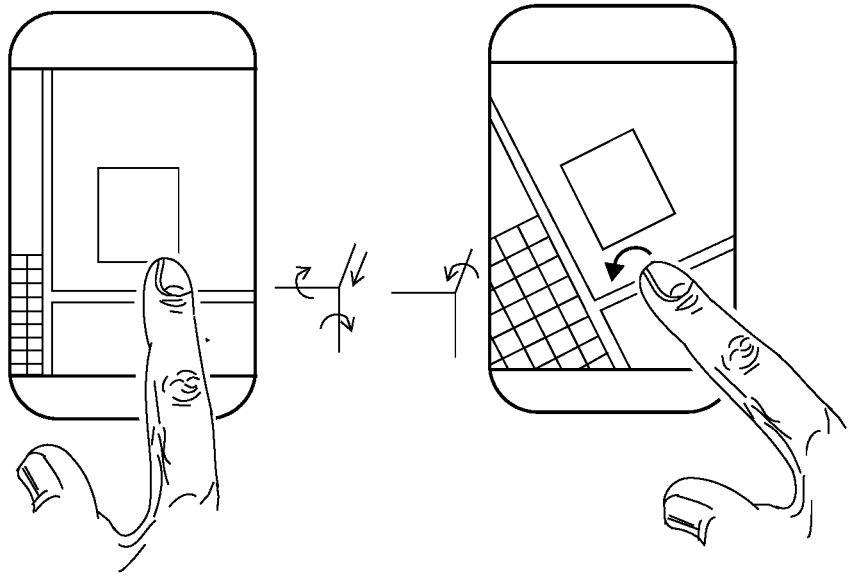
Finger rolls right, pitches forward, increases pressure-map pans right andup, and is zoomed in.
Fig. 23E
Finger yaws left, map rotates couterclockwise.
Fig. 23F
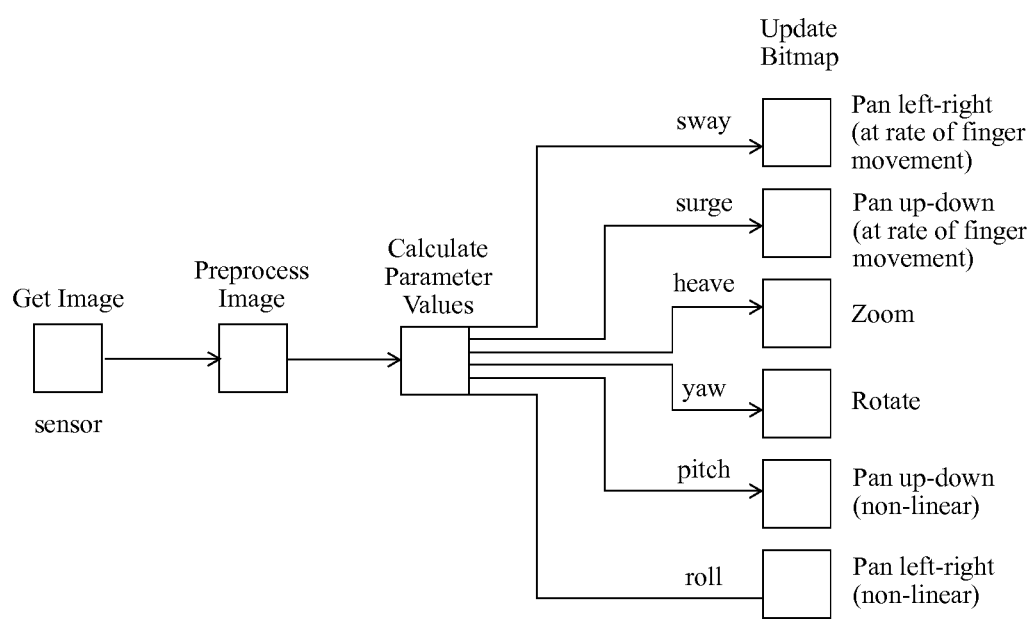
Fig. 24

```
typedef struct parm parm;
struct parm {
        float x;   /* extent of x displacement */
        float y;   /* extent of y displacement */
        float heave;/* extent of heave (downward pressure) displacement */
        float roll; /* extent of roll displacement */
        float pitch;/* extent of pitch displacement */
        float yaw;/* extent of yaw displacement */
};

int main(void)
{
        float frame[NROW*NCOL];
        parm p;
        window w;
        bitmap b;

for (;;) {
                getframe(frame);
                procframe(frame);
                getparms(frame, &p);
                updatemap(&p, &b, &w);
        }
} void updatemap(parm *p, bitmap *b, window *w)
{
        zoom(b, p->heave);
        rotate(b, p->yaw);
        pan(b, p->roll, p->pitch);
        putbmp(b, w);
}
```

Fig. 25

Web page displayed
with finger in neutral position

Finger increases pressure
web page zoomed in

Finger yaws, link is selected

Web page displayed with finger in neutral position

Move to select a recently viewed web page entered when finger pressed down

Finger rolled right scroll page to right

Currently selected web page displayed when finger pressed down

Web page displayed
with finger in neutral position

Screen of 1 after translates
finger to the right and forward

Screen of Figure 30a
after rolling finger left

List of playlist displayed, finger rolled right

Playlist displayed, finger rolled right

Current song displayed, finger in neutral position

Finger with neutral yaw, message played goes halfway

Message moved back by yaw rotation to left

Message moved forward by yaw rotation to left

Center key selected with finger in neutral position

Rolling Finger to right select key to right

Pitching finger forward selects keys on top row

Rolling finger to left and pitching back selects left key on bottom row

Letter keyboard selects with finger in neutral position

Number-symbol keyboard selected with finger in pitched forward

Screen with simple
word-completion
mechanism

After yaw
rotation,
list of words
appears

Roll tilt right
scrolls down
list

Increased
downward
pressure
inserts
selected word

SENSORS, ALGORITHMS AND APPLICATIONS FOR A HIGH DIMENSIONAL TOUCHPAD

CROSS-REFERENCE TO RELATED APPLICATIONS

This application claims priority from U.S. Provisional Application 61/089,386, filed Aug. 15, 2008, the contents of which are incorporated herein.

FIELD OF THE INVENTION

It is well known that conventional, low-dimensional pointing devices like the mouse, which have only two independent ways of moving or degrees of freedom (DOFs), can be tedious and inefficient to use. The small size of cell phones and many other consumer electronic devices exacerbates the problem, making them even less efficient, and more difficult, to use. Contributing to the solution of these problems will help address the larger problem of improving the usability of computing systems and devices—that is, to provide interfaces that make operating such systems intuitive, efficient and appealing.

DESCRIPTION OF THE RELATED ART

The need the technology disclosed herein addresses is for a pointing device that can be used to operate computer systems and electronic devices, and that can be used with small, handheld devices as well as larger systems. This need has been addressed predominantly with computer mice, trackballs, conventional touch pads (such as those found on many laptop computers), and, for smaller devices, mechanical buttons. More recently, improved touch interfaces have appeared on the market, which provide multi-touch and gesture recognition capabilities. There are two main problems that these existing interfaces pose: the low-dimensionality problem (LDP) and the small-format problem (SFP).

The LDP occurs because the most widely available pointing devices provide control of only two continuous, independent dimensions or parameters, varied by side-to-side movements (sway) or forward-back movements (surge). Devices, like those mentioned, that incorporate multi-touch or gesture recognition capabilities have more DOFs and provide control of more parameters, but their capabilities are nevertheless still limited, and can be improved. The reason is that the systems the pointers are used to control typically have many more parameters that can be varied. Thus the small number of pointer parameters creates a bottleneck, forcing the user to carry out many additional or overhead operations that could be avoided with a pointing device with more degrees of freedom.

To see the effects of the bottleneck, consider some of the things a user must do, using a typical word processing application in a windowing environment, to cut text from one document and paste it in another. After dragging the mouse to select the text to cut, the user must move the mouse to select "Cut" from the Edit menu. She must move the mouse again to set the insertion point in the target window, and move the mouse yet again to select "Paste" from the Edit menu. The movements required to select "Cut," to set the insertion point, and to select "Paste" are all overhead operations, required to change the assignment of the two parameters of the mouse to different parameters of the word processing application. These are only some of the overhead operations that must be performed in this task.

The example illustrates partitioning, one of the two main strategies used to cope with the LDP. Partitioning, which can be used for discrete as well as continuous operations, is the technique of assigning different functions to different regions of a visual display or a device. For instance, in the example, one uses one part of the display to select text in one document, another part to set an insertion point in the second document, and other parts to execute the cut and paste operations. In every case, one uses the same two-dimensional surface to perform the functions, but the nature of the function varies depending on the region of the display or the device that the user has selected.

The second problem, the SFP, is a special case of the LDP: it is the LDP as it occurs in using small, portable or handheld devices. The lack of a high-dimensional pointing device is a more severe problem in using small devices than larger ones because the small size of the visual display or control surface limits the size and number of partitions that can be created. As a result, in small devices partitioning is typically supplemented with sequencing, the temporal analog of partitioning. Sequencing is used less extensively in larger devices.

In sequencing, rather than assigning different functions to different regions of a control surface at the same time, different functions are assigned to the same regions at different times. For instance on a smart phone, one screen is used to select a playlist, a second to select a song in the playlist, and a third to control the playback of the selected song. Sequencing, like partitioning, requires overhead operations. However, they are also required to change the function of screen regions—for instance, by pressing an on-screen button—rather than only to move from one region to another, as in partitioning.

SUMMARY OF THE INVENTION

In one embodiment, the invention comprises a method for controlling an electronic device through the touch of at least one finger on a tactile array sensor, measuring at least one change in one angle of the position of the finger with respect to the surface of the tactile array sensor, producing a measured-angle value, and using the measured-angle value to control the value of at least one user interface parameter of the electronic device.

In another embodiment, the invention comprises a method for controlling an application operating on an electronic device via the touch of at least one finger on a tactile array sensor, measuring at least one change in one angle of the position of the finger with respect to the surface of the tactile array sensor, producing a measured-angle value, and using the measured-angle value to control at least one attribute of the application operating on the electronic device.

In yet another embodiment, the invention includes a method for refining raw measurements responding to at least a first and a second finger position attribute, the first and second finger position attributes being any distinct two of roll, pitch, yaw, surge, sway, and heave. The method comprises obtaining first tactile array measurement data from the tactile sensor array for a first time interval, processing the first tactile array measurement data, performing a first raw measurement computation operation resulting in a first time interval raw first finger position attribute value, and performing a second raw measurement computation operation resulting in a first time interval raw second finger position attribute value.

The method also includes obtaining second tactile array measurement data at a second time interval, processing the second tactile array measurement data, performing a first raw measurement computation operation resulting in a second time interval raw first finger position attribute value, and performing a second raw measurement computation operation resulting in a second time interval raw second finger position attribute value.

After obtaining the first and second raw finger position attribute values for the first and the second time intervals, a rate of change for the first and the second finger position attributes are determined.

If the rate of change of the of the first finger position attribute is sufficiently larger than the rate of change of the of the second finger position attribute, then the second time interval raw first finger position attribute value is provided as the first finger position attribute and the first time interval raw second finger position attribute value is provided as an output for the second finger position attribute.

If the rate of change of the of the first finger position attribute is sufficiently smaller than the rate of change of the of the second finger position attribute, providing the first time interval raw first finger position attribute value is provided as the first finger position attribute and the second time interval raw second finger position attribute value is provided as an output for the second finger position attribute.

In still another embodiment of the invention, the roll angle of a finger in contact with a tactile sensor array is measured by obtaining tactile array measurement data from the tactile sensor array, processing the tactile array measurement data with at least one data array processing algorithm by the processor, performing a first identification operation for identifying edge information of the processed tactile array measurement data resulting in edge location data, performing a second identification operation for identifying the peak region of the processed tactile array measurement data resulting in peak location data, and calculating a relative roll angle measurement of the finger using the edge location data and the peak location data resulting in roll angle measurement data.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. The figures illustrate what is described in the Detailed Description of the Invention.

FIGS. 7a-7e illustrate handheld devices comprising at least one HDTP sensor.

FIG. 9 illustrates an exemplary pre-processing module.

FIG. 10 depicts the effect of finger yaw rotation on a contact region.

FIG. 11 depicts an exemplary procedure for calculating a yaw angle.

FIG. 12 illustrates exemplary pseudo-code for calculating second moment of inertia tensor.

FIG. 13 depicts an exemplary calculation of the yaw angle from an image.

FIG. 14 depict an exemplary calculation of major and minor axes and eccentricity of contact region.

FIG. 15 illustrates the effect of pitching a finger forward on a contact region.

FIGS. 17a-17c depict the effects of rolling a finger having neutral pitch on the shape of the resulting contact area.

FIGS. 18a-18c depict the effects of rolling a finger when pitched forward on the shape of the resulting contact area.

FIGS. 19a-19f depict the effects of rolling a finger when pitched forward and pitched bank on the resulting intensity distributions.

FIG. 20 depicts the effect of rolling a finger when pitched very far back on the resulting intensity distribution.

FIGS. 21a-21c shows the effect of roll on the distribution of force across the contact region.

FIG. 22 depicts an exemplary architecture for decoupling parameters.

FIGS. 23a-23f depict exemplary operations for map applications and associated finger movement.

FIG. 24 shows an exemplary architecture for map application.

FIG. 25 depicts exemplary pseudo-code for implementing map applications.

DETAILED DESCRIPTION OF THE INVENTION

Introduction

Figure 1A:
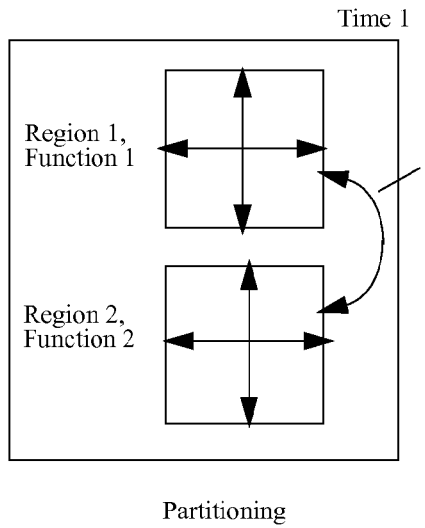
FIGS. 1a-1b illustrate the strategies of partitioning and sequencing.
Figure 1B:
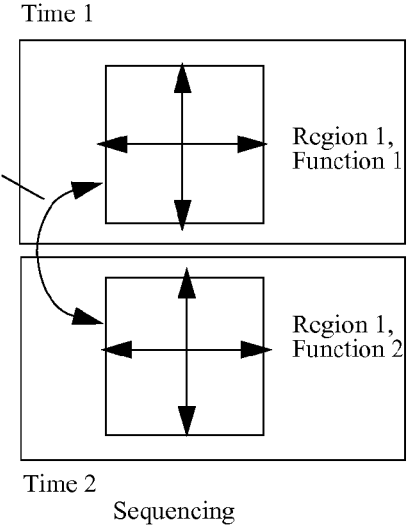

Partitioning and sequencing are illustrated schematically in FIG. 1. In both cases, overhead operations, represented by the curved arrows, are required to change how the dimensions of a conventional pointing device are assigned so it can be used to carry out two different functions, which together require varying more dimensions than the pointing device provides. And in both cases, the overhead operations can interfere with the user's ability to use computing devices to carry out tasks. The reason is that overhead operations multiply the number of movements the user must make, and can increase the cognitive load on the user, since they may force her to repeatedly divert her attention from carrying out a task, such as editing a document, to the mechanics of doing so.

But there is an important asymmetry between partitioning and sequencing. Because multiple partitions can be displayed at one time, partitioning can provide visual cues about the context in which a particular task is carried out. But in sequencing, there will be fewer visual cues, or they will be altogether absent. This can force the user to rely on her memory for the context of a given operation, imposing an additional cognitive burden. Further, as the size of a device decreases, the number of different screens required to carry out a given task will typically increase. For these reasons, smaller devices are generally less efficient and harder to use than larger ones.

Degree of Urgency for Solutions to the LDP and SFP

Partitioning and sequencing are strategies for displaying information as well as for control. As display strategies, they can have considerable value, and in many cases are indispensable. The problems that result from their use are not, in general, that different regions of a screen, or different screens, display different but related information. To decompose a high-dimensional space into multiple lower-dimensional spaces that are displayed in separate regions can decrease the cognitive load on the user. And only so much information can be displayed on a screen at once, so the extensive use of sequencing is unavoidable for small screens. But as control strategies, they are prone to severe problems.

The problems lie in what the user must do to move among partitions or screens—that is, the problems are due to the overhead operations that are required. In particular, low-dimensional pointing devices pose a serious problem because several times as many operations—most of which are overhead operations—may have to be carried out with a lower-dimensional device as with a higher-dimensional one. Adding to the problem, these operations may require a high degree of precision, as in moving an on-screen pointer over a scroll arrow or pressing a small virtual, on-screen button on a smart phone, further increasing the cognitive load. Nor are the LDP and SFP isolated problems, confined to a small number of people who require specialized tools. Rather, because of the prevalence of computing devices, these are problems faced by a significant portion of the world's population, including the vast majority of people in industrialized societies.

The extent and severity of the problems are evident from the eagerness with which smart phones are adopted. There are undoubtedly a number of reasons for its popularity, but one particularly important one would seem to be that it is not only touch operated, but enables users to overcome some of the limitations of low-dimensional devices by exploiting gestures and multi-touch interactions in addition to more conventional interaction techniques.

Pointing technologies found on the smart phone are important steps in improving the usability of computing devices, but there are further improvements that can be made. A pointing interface that has even more dimensions is even easier and more pleasing to use. The high-dimensional touchpad (HDTP) disclosed herein is adapted to be one such pointing device.

HDTP Technology

In one embodiment, the HDTP utilizes an array pressure sensor, or tactile sensor, combined with real-time image analysis firmware, software or hardware to create a pointing device with a number of desirable features:

a large number of continuous, as well as discrete, degrees of freedom;
natural, intuitive and efficient operation;
several degrees of freedom that are available using a contact area not much larger than a fingerprint;
gesture recognition and multi-touch capabilities;
recognition of a variety of different forms of hand contact;
recognition of patterned sequences of contact; and
flexibility in the manner in which it is operated.

Although there are existing and emerging pointing devices that have some of these features, what sets the HDTP apart is its potential to provide them all in an improved form, and in a single device that has a low physical profile and can be implemented in a range of different shapes and sizes. As a result, the HDTP could enhance the capabilities and improve the operation of a wide variety of different systems and devices, among them:

The windowing systems found on personal computers, where the HDTP could enhance the user's ability to operate common applications like word processors, spreadsheets and web browsers.
Drawing or painting software applications.
Small handheld devices, particularly ones that provide a large number of complex applications.
Electronic musical instruments and related systems; for instance, small HDTPs could be mounted on a guitar or affixed to keys of a keyboard, or used to control a complex application like a mixer.
CAD/CAE systems, where the HDTP could be used to manipulate objects in a virtual three-dimensional space.
Machine control, telerobotics and other industrial systems.
Assistive devices for disabled persons, where the HDTP's sensitivity to fine movements and flexibility in its manner of operation could be particularly valuable.

Operation

Figure 2:
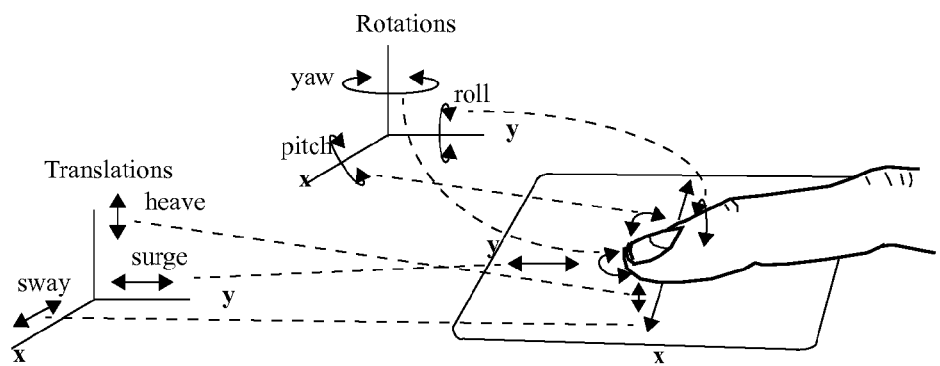
FIG. 2 illustrates how a finger can simultaneously adjust several or all of the parameters with viable degrees of independent control.

There are many possible ways in which the HDTP could be operated, but the following example illustrates one particularly noteworthy way, in which the user operates the touchpad with the tip of her index finger. As shown in FIG. 2, the fingertip has six degrees of freedom, three translations and three rotations: (1) side-to-side translation (sway), (2) forward-back translation (surge), (3) increased/decreased downward pressure (heave), (4) side-to-side tilt (roll), (5) forward-back tilt (pitch), (6) side-to-side swivel (yaw). Note that the last four movements can be made using a surface with a very small area, not much larger than a fingerprint. By assigning each degree of freedom to a different parameter of an external system, the user could control up to six parameters without having to carry out the overhead operations a lower-dimensional pointing device would require. And, because movements in four of the degrees of freedom require only a very small area, they can be particularly advantageous for operating portable or handheld devices.

Architecture

Figure 3:
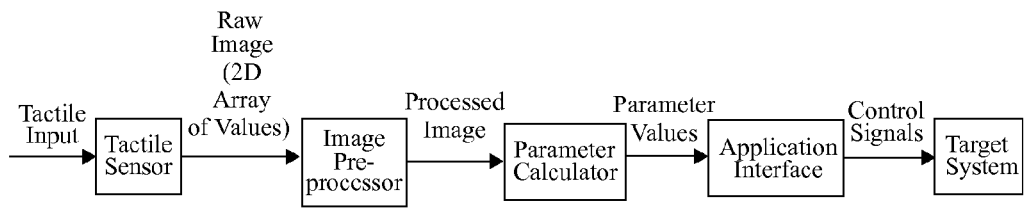
FIG. 3 illustrates the information flow and high level architecture of one embodiment of an HDTP.

The high-level architecture of one embodiment of the HDTP, as well as the information flow from input to output, is shown in FIG. 3. The tactile sensor comprises a grid of independent, pressure-measuring cells, capable of distinguishing multiple levels of pressure, with the exact number depending on the characteristics of the sensor. The sensor converts tactile input into a "pressure image," a two-dimensional array of pressure values representing the distribution of the pressure applied to the sensor's surface. The image processing component uses the pressure images to calculate the values of various parameters, which can include the size of the contact area, the total pressure, the average pressure, the geometric center of the contact area, the extent of the yaw rotation and so on. An application interface generates control signals on the basis of the parameter values; for instance, it could use the value for the total pressure to set the zoom level of a document, or roll values to set the position of a cursor. The user directly controls parameters such as the average pressure and geometric center, proximal parameters, and the parameters or dimensions of the system controlled using the HDTP distal parameters. Note that implementing the image processor and the application interface as separate modules will facilitate adapting the HDTP for different uses since the application interface could be tailored for different applications without changing the rest of the system.

HDTP Sensor Hardware

Figure 4:
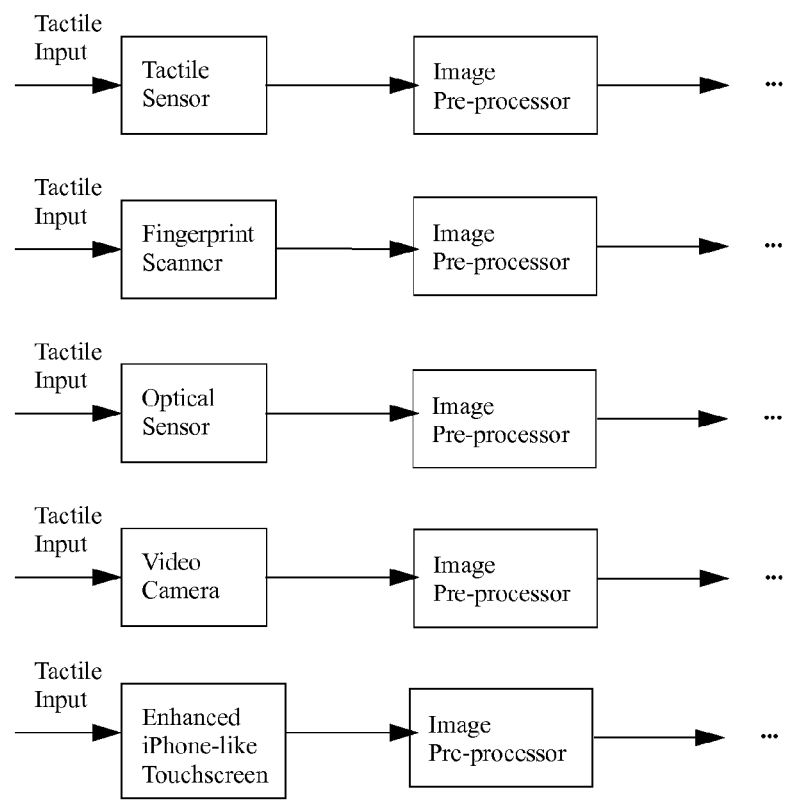
FIG. 4 illustrates various exemplary HDTP sensors.

The core idea of the HDTP is to provide a touch interface with a sufficiently high resolution to capture nuances of finger and hand movements. In the case of a single finger, these nuances would include movements in all six possible degrees of freedom, as shown in FIG. 2. Although the embodiment of the present invention just described utilizes a tactile sensor, there are a number of other kinds of sensors that could be used. These other kinds of sensors, illustrated in FIG. 4, include fingerprint scanners, optical sensors or video cameras, and enhanced versions of the smart phone touch screen. These and related sensors will now be considered.

Fingerprint Scanners: Fingerprint recognition technology is mature, robust and inexpensive. Fingerprint scanners have a significantly higher spatial resolution than even the highest-resolution tactile sensors. As a result, it may be possible to use binary images in place of multilevel ones. This could be done, for instance, by exploiting deformations in the patterns of ridges due to pressure and/or parallax to calculate the amount of pressure applied by the finger to the sensor surface and the relative distance of different parts of the finger from the scanner surface. It should be noted, however, that fingerprint sensors could be utilized to provide multilevel information as well—for instance, capacitive fingerprint scanners can detect a plurality of gradations in the distance of various parts of a finger to the scanner surface. The patterns of ridges could also be used to identify certain kinds of movements, and to measure their rate and extent.

A touchpad that incorporates a fingerprint scanner has been developed, though the fingerprint scanner is used for authentication rather than as a user interface. The use of a fingerprint scanner for a user interface, and using it to detect variations in pressure and yaw rotation has been disclosed in Russo et al. (see below). However, Russo et al. have failed to appreciate that a fingerprint scanner could be used detect variations in all six DOFs of a single finger, as well as in movements combining more than one finger, and to appreciate how movements of different kinds carried out simultaneously or sequentially in various combinations could be advantageously utilized to operate a device or system.

Optical Sensors and Video Cameras: Small optical sensors or video cameras, such as those used in optical mice and mobile phones, could also provide sensors for the HDTP. (In addition some fingerprint scanners are optically based.) Like fingerprint recognition technology, the technology for optical sensors and video cameras is mature, robust and inexpensive. For example, current and proposed mobile phones use a built-in video camera for gesture recognition as well as generating video images. A similar camera with sufficiently high resolution could provide images suitable for the HDTP.

Enhanced Smart Phone Touchscreen: Patents have been filed that disclose a touchscreen with not only a multi touch capability (see, for example, Steven P. Hotelling et al., "Multipoint Touch Surface Controller," US 2007/0257890), but the capability to distinguish multiple levels of pressure (see, for example, Steven P. Hotelling et al., "Force Imaging Input Device and System," US 2007/0229464). A touchscreen like that is suitable for some embodiments of the HDTP, particularly if it is adapted to provide a higher spatial and pressure resolution. Note, however, that even a touch screen with relatively low spatial and pressure resolution could provide partial capabilities of the HDTP.

Tactile Pad Integrated in Large Display for Mobile Devices: A display that rolls and unrolls up for portability and attached to a mobile device has been developed. A flexible HDTP, such as one based on a tactile sensor, could be integrated into the display to provide an enhanced touch interface.

Sensors for Binary Images: It is possible to calculate values for proximal parameters from hand and finger images that are binary—that is, images that consist of only off and on pixels, though more precise calculations may require multilevel information. In fact, values could be calculated for some proximal parameters using only the outlines of images. (See the discussion of image analysis algorithms below.) If only binary images are used, there are many more options in terms of sensors that could be used. For instance, a relatively low-resolution fingerprint scanner capable of acquiring only binary images could be used. In general, using binary images in place of multilevel ones will result in an HDTP with a lower production cost, though multilevel images may be needed for applications where a high degree of precision is required.

Figure 5:
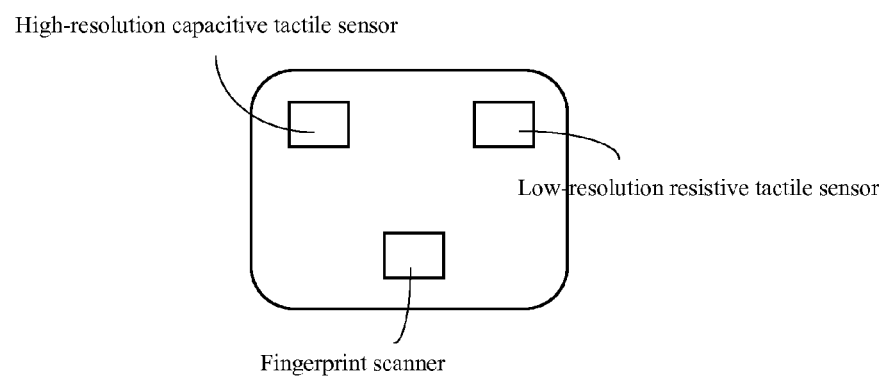
FIG. 5 illustrates an HDTP touchpad that serves as a peripheral device for a personal computer or workstation that may comprise three different kinds of sensors.
Figure 6:
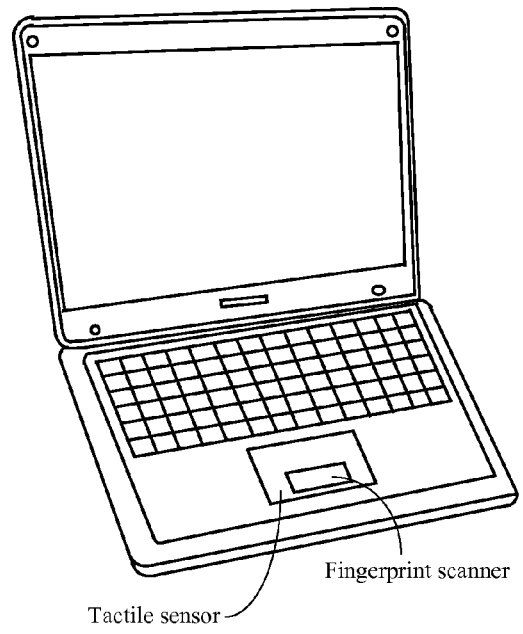
FIG. 6 depicts a laptop computer comprising a tactile sensor and a fingerprint scanner.

Hybrid HDTPs: One point to note is that a single device or system could comprise more than one kind of sensor to form a "hybrid" touch interface. For instance, as shown in FIG. 5, a HDTP touchpad that serves as a peripheral device for a personal computer or workstation could comprise three different kinds of sensors: a fingerprint scanner; a low-resolution, capacitive tactile sensor, and a high-resolution, resistive tactile sensor. An HDTP in a laptop computer, as shown in FIG. 6, could also comprise a tactile sensor and a fingerprint scanner. These are just a few of many possible examples of hybrid HDTPs, as will be apparent to one of ordinary skill in the art. There are at least two reasons why it could be advantageous to have a hybrid HDTP. First, to reduce the cost of a product, a lower-resolution but less expensive sensor could be used for most of the HDTP, and a higher-resolution but more expensive sensor could be used for a small part of it. Another reason has to do with functionality. Some types of sensors may be better suited for certain uses than others. For instance, because tactile sensors are flexible, they could be used in places where a fingerprint scanner could not. In some embodiments of the present invention, a high-resolution portion of a hybrid HDTP is implemented using a fingerprint scanner, which doubles as a security device used for user authentication.

It will be apparent to one of ordinary skill in the art that many different kinds of array or matrix sensors that have a sufficiently high resolution and are responsive to tactile input, like those mentioned, can be utilized as a sensor for the HDTP.

HDTPs in Handheld Devices

With the advent of the smart phone, handheld devices with touch interfaces have become popular and increasingly prevalent. Such devices already incorporate some sophisticated capabilities, such as recognition of gestures, and multi touch capabilities. By including an HDTP as part of a touch interface, or as the entire touch interface, those already-sophisticated capabilities could be considerably enhanced. There are a number of different possible embodiments.

Figure 7D:
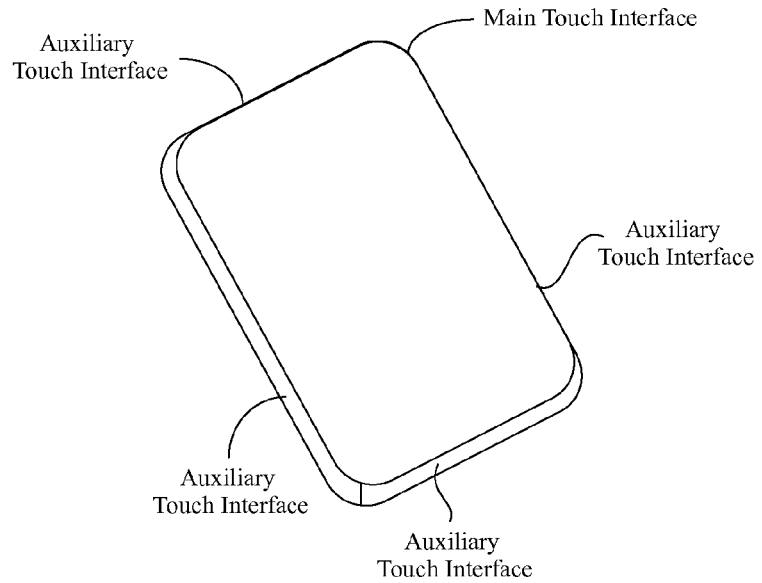
Figure 7E:
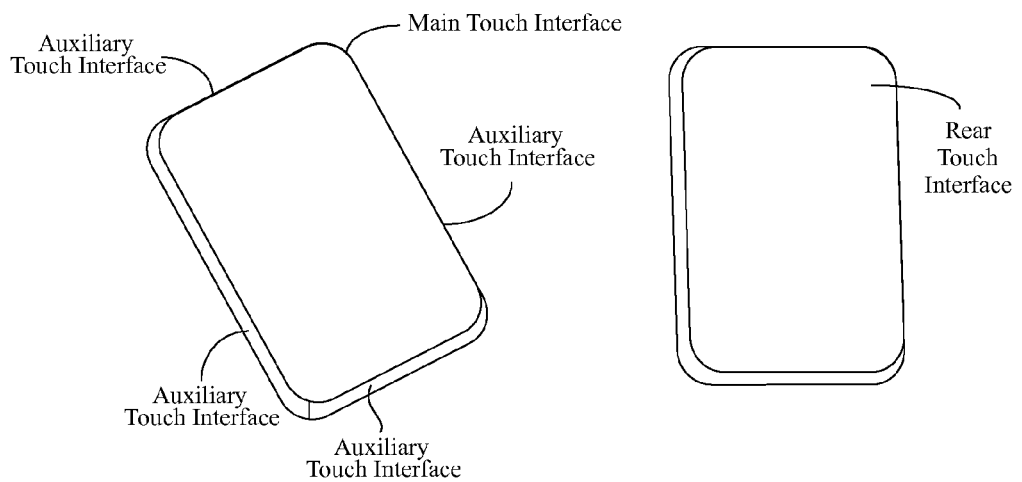

In one embodiment, illustrated in FIG. 7a, an HDTP supplements mechanical buttons. In a variation of this embodiment, small HDTPs are affixed to the surfaces of mechanical buttons, or replace mechanical buttons altogether. In another embodiment, illustrated in FIG. 7b, an HDTP is used for the entire control surface of a handheld device. FIG. 7c illustrates a hybrid version of an HDTP. As shown, there is a small area of the control surface that uses a high-resolution HDTP, with a lower-resolution HDTP, or modern touchscreen, such as that found in a smart phone, making up the rest of the control surface. As mentioned earlier, a fingerprint scanner used as an HDTP could double as a security device used for user authentication. HDTPs could also be affixed to the sides of handheld devices, as shown in FIG. 7d. Capacitive tactile sensors would be particularly well suited for this use, because of their durability. FIG. 7e illustrates a case in which a handheld device is entirely encased in HDTPs. Again, as noted earlier, different kinds of sensors could be affixed to different parts of the device—for instance, low-resolution tactile sensors could be used for the sides and rear of the device, while high-resolution tactile sensors or fingerprint scanners could be used for the main control surface, on the front of the device.

Algorithms for Calculating Parameter Values

Figure 8:
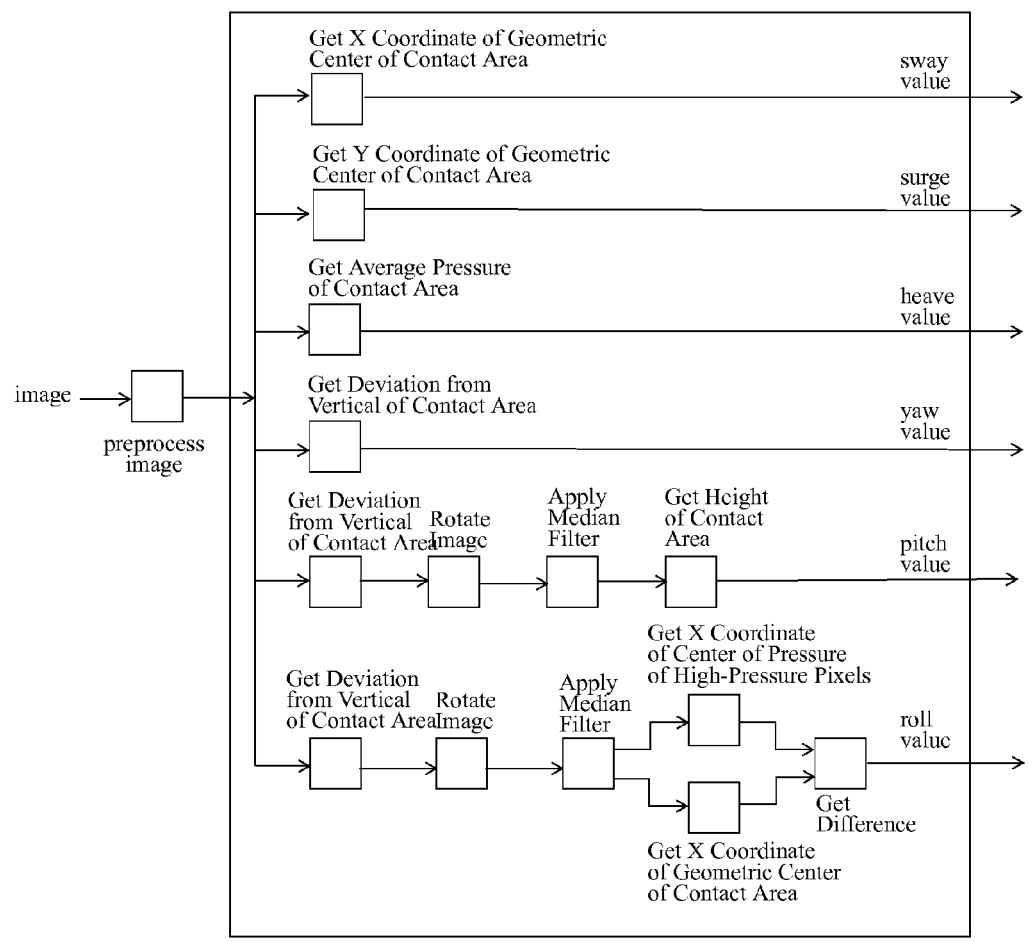
FIG. 8 illustrates a module for calculating the values for each of the six motions of freedom.

In one embodiment, the displacements of a finger in each of six possible DOFs (surge, sway, heave, pitch, roll, yaw) are calculated separately as shown in FIG. 8; it will be clear to one of ordinary skill in the art, however, that it may be advantageous to combine calculations to make calculating the parameters more efficient. Exemplary algorithms for calculating each parameter, some of which are illustrated in FIG. 8, will now be described.

Surge and Sway: An exemplary way to determine the extent of the sway and surge displacements is to use the x- and y-coordinates, respectively, of the geometric center of the contact region. The x- and y-coordinates of the center can be calculated by summing, respectively, the values of the x- and y-coordinates of each loaded cell or "sensel" (for "sensing element") in the entire scanned image and dividing by the number of loaded sensels. An advantage of this method is that it is relatively immune to scattered, relatively isolated noise or out-of-calibration or bad sensels, provided the resolution of the sensor is sufficiently high, since the effects of a few isolated sensels with spurious readings on the calculated values will be negligible. However, if needed, the effects of noise or bad sensels could be reduced or eliminated by applying well known image processing techniques, such as thresholding the images and/or applying median filters. An exemplary image processing module is illustrated in FIG. 9.

Heave: There are a number of different methods that could be used for calculating the extent of heave, the up-and-down translation of the finger. One way to calculate it is to use the mean average of all loaded sensels of the sensor; in a case where a pressure sensor is used, this would be the sum of the pressures of all loaded sensels divided by the number of loaded sensels. Other exemplary ways to calculate heave include using the mode or median average of the pressures, the total pressure, or the number of loaded sensels. An advantage of using the mean average (as well as the mode and median averages) is that the heave value is then independent of the size of the contact region. As a result, these ways of calculating heave would be suitable for cases where the size of a person's fingers is not known in advance, or a device is expected to be used by persons with fingers of different sizes.

Alternatively, it may be advantageous in certain situations to calculate heave in a way that does not require distinguishing multiple levels of pressure. This would be the case, for instance, if binary images are to be used, which, as mentioned, could be advantageous if it is desirable to use inexpensive hardware. To deal with the fact that different people may have fingers of different sizes, a variety of techniques may be used if binary images are required. For instance, the user could train the system by providing sample images when configuring the system for use. This could be done by prompting the user to provide images that vary systematically with respect to the amount of pressure used to make them. In another exemplary technique, the user could set a reference level by holding her finger momentarily on the sensor and providing an indication that she is setting the reference level—for instance, by holding her finger momentarily stationary, or by tapping with a second finger.

Yaw: The yaw algorithm makes use of the fact that in the majority of cases when the finger is placed on the HDTP, the resulting image is essentially elliptical or elongated, as shown in FIG. 10a. When the finger is subjected to a yaw rotation, the resulting image remains essentially elliptical or elongated, though it has a different orientation, as illustrated in FIG. 10b.

These observations are exploited in the following algorithm, which is illustrated at a high level in FIG. 11. The general idea is as follows. First the second moment of inertia tensor is calculated. Then a singular value decomposition (SVD) is applied to the resulting two-by-two matrix. The yaw value is then calculated from the result obtained by applying the SVD. (It should be noted that the value calculated for the yaw rotation of a finger could be advantageously utilized in other contexts besides assigning the value directly to the value of a corresponding distal parameter. For instance, as will be discussed below, it can be advantageous in calculating certain proximal parameters to correct for the yaw rotation of a finger by rotating the pressure image so the finger points essentially straight ahead. The algorithm described herein for calculating the yaw angle can also be used to determine how large such a correction should be.)

An exemplary way to calculate the second moment of inertia tensor is as follows. For each loaded sensel in the image, three values are computed: (1) the square of the x-coordinates, (2) the square of the y-coordinates, and (3) the product of the x- and y-coordinates. A running sum for all the loaded sensels in the image is calculated for each of (1)-(3). The running sums are then used to create a two-by-two matrix consisting of the running sums of (1), (2) and (3), which occurs twice. Next the moment of inertia tensor is normalized. To do this, first the mean averages of the x-coordinates of all the loaded sensels in the image, and of the y-coordinates of all the loaded sensels, are calculated. Then, for each element in the second moment of inertia tensor, the element is divided by the number of loaded sensels, and a quantity is subtracted from it as follows: for the x-squared element, the square of the mean averages of the x-coordinates of all loaded sensels is subtracted; for the y-squared element, the mean averages of the y-coordinates of all loaded sensels is subtracted; and for the two elements that are the sums of the products of the x- and y-coordinates of each loaded sensel, the products of the mean average of the sum of the loaded x-coordinates and the mean average of the sum of the loaded y-coordinates are subtracted. Exemplary pseudo-code for implementing this algorithm is shown in FIG. 12.

An exemplary way to apply the SVD to the second moment of inertia tensor to obtain the yaw angle is as follows. As is know to one of ordinary skill in the art, applying the SVD creates three matrices, typically called "U," "S" and "V."

Element U[0][0] is then divided by element U[0][1]. The arctangent of the resulting quotient is then calculated. The resulting quantity is the yaw angle. A block diagram illustrating this method is shown in FIG. 14.

(It should also be noted that applying an SVD to the second moment of inertia tensor can be advantageously used to calculate the lengths of the major and minor axes of an ellipse corresponding to the contact region. This can be done using the "S" matrix resulting from the application of the SVD: the length of the major axis can be calculated by finding the square root of the product of element S[0][0] and four, and the length of the minor axis can be calculated by finding the square root of the product of element s[1][1] and four. A block diagram illustrating the application of this technique to find the lengths of the major and minor axes and the eccentricity of a corresponding ellipse is shown in FIG. 14.)

When a finger is pitched somewhat forward with a neutral roll (i.e. rolled essentially to neither the right nor the left), the shape of the resulting contact region can be essentially circular. This is illustrated in FIG. 15b; this is in contrast with the essentially elliptical shape of an image generated when the finger is pitched further back, as shown in FIG. 15a. When the image is essentially circular, the yaw angle will be indeterminate. An exemplary way to handle such cases is to retain the last determinate yaw angle. Then, if the yaw value for a given image is indeterminate, the last determinate yaw value is assigned as the yaw value for that image. In this way, discontinuities in the yaw angle as the finger is pitched from front to back or from back to front are prevented.

When a finger is pitched very far forward, so the fingernail comes close to or touches the surface of the sensor, the shape of the contact region is essentially elliptical, as it is when the finger is pitched further back. However, the ellipse in this case is much smaller than when the finger is pitched further back, and the major and minor axes of the ellipse are switched, as illustrated in FIG. 15c. The procedure just described for calculating yaw assumes, however, that the direction in which the major axis of the ellipse points is the direction in which the finger points, so if the major axis of the ellipse is horizontal, then it would be assumed that the finger is turned to point to one side. But, because the major axis will be perpendicular to the direction in which the finger points when the finger is pitched far forward, the assumption will lead to the wrong conclusion in such cases, since it implies that the finger is pointing to the side when it is in fact pointing forward.

An exemplary way to solve this problem is to implement a state machine. The basis for the state machine is the following set of observations. There is a noticeable difference in the sizes of the areas of the two kinds of ellipses; with the ellipse associated with the finger pitched forward being significantly smaller than the ellipse associated with the finger pitched back. Let f be a value such that the areas of the two ellipses are different by a factor of at least f. If the area of the contact region increases by at least f, then the finger points in the direction of the major axis of the ellipse. If the area of the contact region decreases by a factor of at least f, then the finger points in the direction of the minor axis of the ellipse. Thus, by observing how the size of area of the contact region changes, it is possible to determine whether the finger is parallel to the major axis or the minor axis of the ellipse, and so whether the calculation of the yaw angle described earlier can be used as it is, or whether it will need to be rotated by 90 degrees.

Figure 16A:
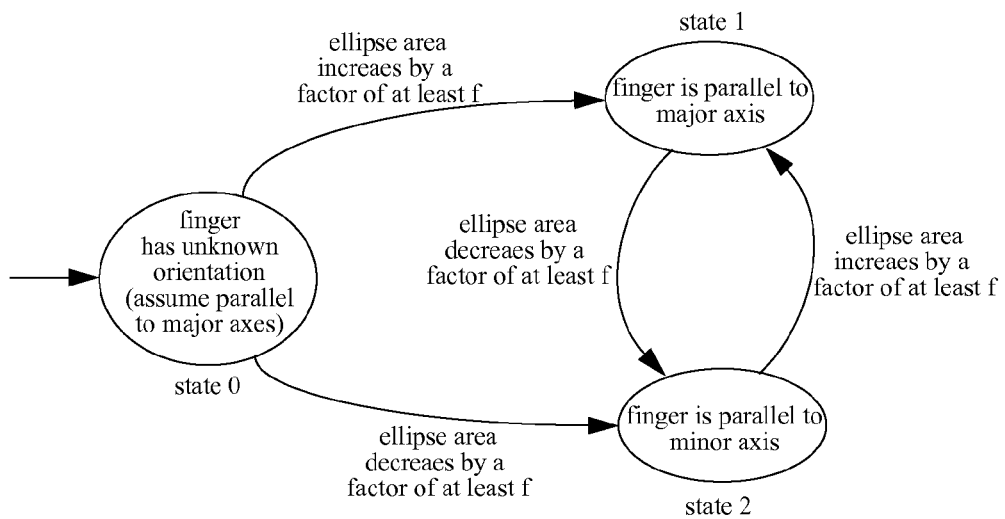
FIGS. 16a and 16b illustrate exemplary state machines based on a change of area and for determining eccentricity of the contact reason in transition between a pitched back and a pitched forward orientation.

FIG. 16a illustrates an exemplary state machine based on these observations. In state 1, the finger is pitched back, and it points in a direction parallel to the major axis of the ellipse of the contact region. In state 2, the finger is pitched forward, and it is parallel to the minor axis of the ellipse. A transition is effected from state 1 to state 2 if the area of the contact region decreases by a factor of at least f, since that will occur only if the finger is being pitched forward. And a transition is effected from state 2 to state 1 if the area of the contact region increases by a factor of at least f, since that will occur only if the finger is being pitched back. Note that unless the area of the contact region changes by a factor of at least f, it will not be possible to determine the orientation of the finger. This is reflected in state 0 of the state machine, the initial state. In state 0, the direction of the finger is unknown, and there is no transition to a known state unless the area of the contact region changes by a factor of at least f. However, although the orientation of the finger cannot be determined until there is a significant change in the area of the contact region; a reasonable assumption can be made. Because pitching the finger far forward is less natural—and so less likely to occur—than pitching the finger further back, it may be advantageous to assume, when the system starts up, that the finger is pointing in the direction of the major axis.

Figure 16B:
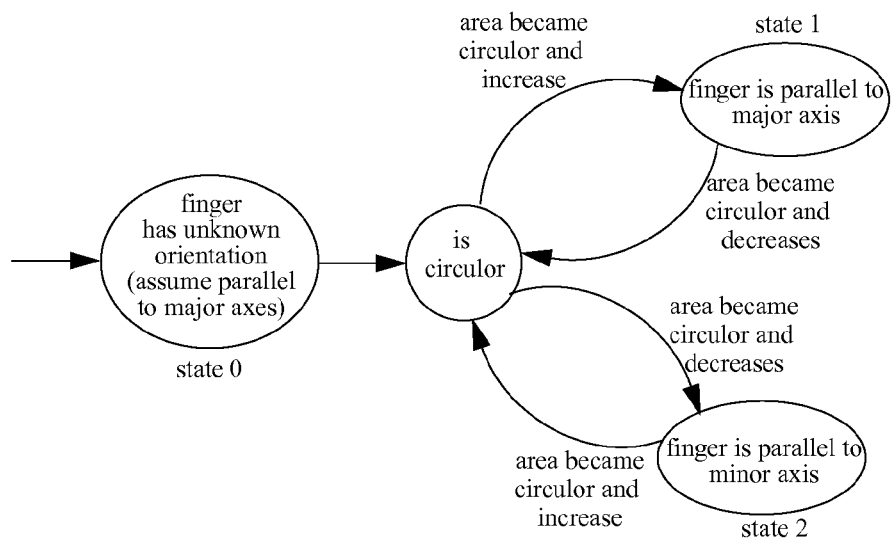
Figure 23A:
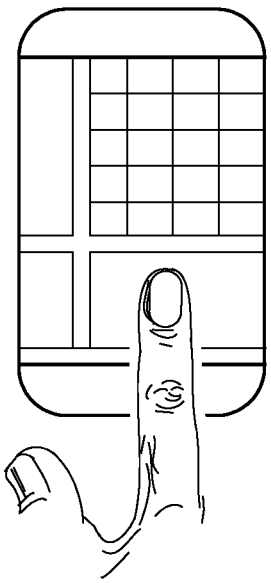
Figure 23B:
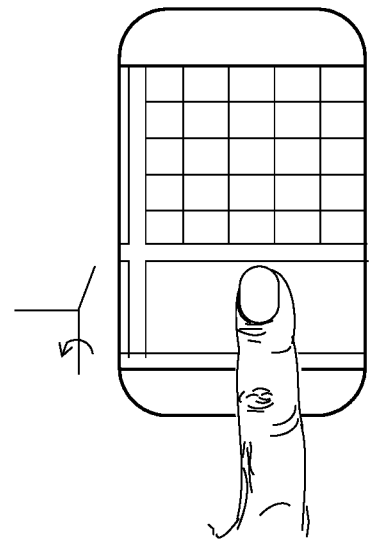
Figure 23C:
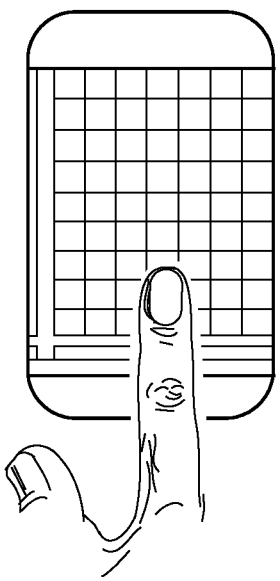
Figure 23D:
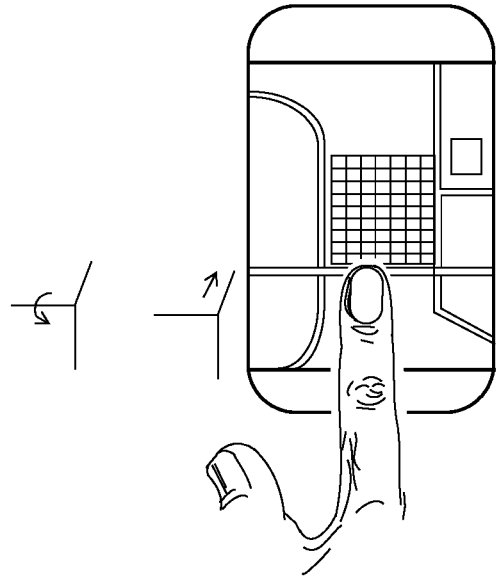

A second exemplary state machine is illustrated in FIG. 16b. It is like the first state machine except, in place of effecting a transition when the area of the contact region changes by a given factor, transitions are effected by considering whether the shape of the contact area becomes less or more circular in combination with considering whether the area of the contact region increases or decreases. Unlike the first state machine, there is no value for the factor f that must be chosen. Whether the contact region counts as circular or not could be based on the eccentricity of the region's shape—that is, on the ratio of the major and minor axes.

Pitch: An exemplary way to calculate a value for the extent of the pitch displacement is based on the following observation: as the finger pitches from back to front when it is oriented vertically so the yaw angle is essentially zero, the vertical distance from the top of the contact region to the bottom becomes steadily smaller (provided it is not pitched too far forward), as illustrated in FIGS. 15a-c. This observation suggests the following exemplary algorithm for calculating pitch. (1) The technique described in the last section is used to calculate the yaw angle. (2) The value for the yaw angle is used to rotate the image so the contact region is oriented vertically. (3) The least y-coordinate of the loaded pixels is subtracted from the greatest y-coordinate of the loaded pixels. The difference is the value assigned to pitch. This algorithm is depicted in FIG. 8.

In some situations it may be advantageous to remove noise, since noise may occur near the edges of the image as a result of shear or oblique forces. In such situations, there can be loaded pixels that fall outside the contact region, the region where the finger actually touches the sensor. Because these spurious loaded sensels tend to occur at the edges of the sensor, the distance between the least and greatest y-coordinates of the loaded sensels may reflect the presence of noise rather than the height of the contact region.

One exemplary approach that could be taken to solve this problem is the following. Because pixels that are loaded due to shear or oblique forces in many cases have low pressure values, they could be eliminated by thresholding the entire image. If the spuriously-loaded sensels have sufficiently low pressure values, then a low-level threshold could eliminate the spuriously-loaded pixels while preserving the loaded pixels in the contact region.

A second exemplary approach could advantageously be taken in cases where the spuriously-loaded sensels are relatively isolated because, on this approach, the sensels could have any pressure values. This approach is to apply a median filter, a well-known technique for removing scattered noise from an image (see R. C. Gonzalez and R. E. Woods, *Digital Image Processing*, 3rd ed., Prentice Hall, Upper Saddle River, N.J., 02008). When a median filter is applied to an image, each pixel in the image is assigned a value in turn. The assignment for a given pixel is made by considering its neighborhood, the pixels that surround it, with the value assigned being the median of the values of all the pixels in the neighborhood, including the value of the pixel whose value is to be assigned. Neighborhoods of different sizes can be used, but they are typically squares, with the pixel whose value is to be assigned at the center.

Another problem that can arise is due to the fact that when the finger is pitched far enough forward, the fingernail will come in contact with the sensor. This increases the height of the contact region. As a result, if the calculation of the pitch displacement is based only on the height of the contact region, it will not be possible to distinguish cases in which the finger is pitched all the way forward from cases in which it is pitched further back. This can be problematic, since if the user is using variations in pitch to control variations in a dimension of a target system, she will need to be able to induce the variations in the target system dimension in a predictable way. This is best achieved by a simple, monotonic response, so that the pitch value consistently decreases as she pitches her finger forward and consistently increases as she pitches her finger back.

One exemplary solution is to look at differences in the shapes of the contact regions, since regions formed when the fingernail touches the sensor surface will have a different shape from those formed when it is pitched further back, even though they have the same height. Another exemplary solution is to ignore changes in the height of the image when the height falls below a certain value. A very simple way to achieve this, which requires no change to the algorithm described earlier, is to require that the tip of the user's finger lie off the sensor surface when operating the HDTP so the problematic cases never arise.

Roll: Calculating the roll displacement appears to be the most complex of the six basic parameters associated with the movement of a single finger. The reason has to do with the variability in the shapes and sizes of the contact region depending on the extent of the pitch displacement when the finger is rolled, as illustrated in FIGS. 15*a-c*. When the finger is pitched all the way forward, so the fingernail is close to the sensor surface, the contact region is essentially elliptical, with the minor axis parallel to the direction in which the finger points. As the finger is pitched back, the contact region becomes essentially circular, and then essentially elliptical again, with the size of the contact region steadily increasing. Also, the ellipse formed when the finger is pitched back is rotated by 90 degrees from the ellipse formed when the finger is pitched forward, so the direction in which the finger points is parallel to the major axis rather than the minor axis, as it is when the finger is pitched forward.

Because of these differences in the shape of the contact region depending on the pitch of the finger, there is no simple signature for roll, since the changes in the appearance of the images that result when the finger is rolled vary depending on the pitch of the finger. When the finger is pitched back, the shape of the contact region changes as the finger is rolled, as illustrated in FIGS. 17*a-c*: when the finger is rolled neither to the right nor left, the image is elliptical, as illustrated in FIG. 17*b*; as it is rolled to the right, the right side of the contact region becomes increasingly straight, while the left side remains curved, as illustrated in FIG. 17*c*; and as it is rolled to the left, the left side of the contact region becomes increasingly straight while the left side remains curved, as illustrated in FIG. 17*a*. This pattern of variations suggests that roll displacement could be measured by considering how curved the horizontal borders of the contact region are. However, when the finger is pitched far enough forward so the contact region is circular, it remains essentially circular regardless of how the finger is rolled, as illustrated in FIGS. 18*a-c*.

One exemplary strategy is to treat roll as undefined when the contact region is essentially circular, thus requiring that the user's finger not be pitched too far forward to vary the roll parameter. (In such cases, the last defined value for roll could be retained, as described earlier for yaw.)

A second exemplary strategy involves taking account of the pressure distribution across the contact region. One possibility is to use the horizontal displacement of the center of mass of the contact region from its geometric center. However, the center of mass and geometric center tend to be too close together for this to work. Nevertheless, visual inspection of pressure images suggests that even though the geometric center and center of mass are close, the pixels with the highest pressures tend to be concentrated towards the right or left edge of the contact region depending on whether the finger is rolled to, respectively, the right or the left. Further, the relative distance of the highest-pressure pixels from the horizontal edges of the contact region tends to vary as a function of the amount of roll displacement, so that the greater the displacement, the closer the high-pressure pixels are to one edge.

These tendencies are illustrated in FIGS. 19*a-f*. In FIG. 19*a* the finger is rolled left when pitched forward, and in FIG. 19*d* the finger is rolled left when pitched further back. In both cases, the highest-intensity pixels are concentrated near the left edge of the contact regions. In FIG. 19*c* the finger is rolled right when pitched forward, and in FIG. 19*f* the finger is rolled right when pitched further back. In both cases, the highest-intensity pixels are concentrated near the right edge of the contact regions. In FIG. 19*b* the finger has a neutral roll when pitched forward, and in FIG. 19*e* the finger has a neutral roll when pitched further back. In contrast with the other cases, in these cases the highest-intensity pixels are distributed essentially evenly across the image, and are not concentrated closer to one side of the contact region or the other.

The following exemplary algorithm, depicted in FIG. 8, for assigning a value to roll exploits the observed regularities.

(1) Rotate the image to normalize its orientation.

(2) Get a pressure histogram for the image.

(3) Find the pressure such that there are x % pixels in the image with at least that pressure. (The exact value of x is to be determined empirically. It is expected, though, that it will be somewhere in the range 20-25%.)

(4) Threshold the image to set all pixels below the threshold to 0.

(5) Get the center of mass of the resulting image.

(6) Get the horizontal distances from the center of mass to the left and right edges of the contact region in the original image.

(7) Get the ratio of the two distances; a useful roll value will be related to the ratio.

It may be advantageous to use a different algorithm to better accommodate cases where the finger is pitched very far back, so the top surface of the finger comes close to being parallel to the sensor surface, and the base of the end joint of the finger approaches or touches the sensor surface. An exemplary image showing the resulting contact region and the pressure distribution is shown in FIG. 20. As can be seen from the figure, in this sort of case the highest concentrations of high-pressure sensels are not confined to the edge of the image, but extend horizontally beyond the geometric center.

An alternative algorithm for measuring roll is suggested by FIGS. 21a-c. These figures include graphs illustrating schematically the force (i.e. total pressure) as a function of each column of sensels. The graphs have distinctive shapes associated with the direction of the roll. When the finger is rolled to the right, shown in FIG. 21c, the columns with the highest force are shifted towards the right edge of the contact region, and the force decreases more quickly in the columns to the right of the peak than to the left. When the finger is rolled to the left, shown in FIG. 21a, the force versus column graph is essentially a mirror image of the graph created when the finger is rolled to the right, with the columns with the highest force shifted towards the left edge of the contact region, and the force decreasing more quickly in the columns to the left of the peak than to the right. By contrast, when the finger is essentially not rolled, as shown in FIG. 21b, the force versus column graph forms a roughly Gaussian curve, and there is no clear asymmetry as there in the cases in which the finger is rolled.

The pattern evident in the force versus column graphs could be exploited in a number of ways to create a metric for roll. An exemplary algorithm to do so is to count the number of columns from the right edge of the contact region to the nearest column with a maximal force value, and the number of columns from the left edge of the contact region to the column closest to it with the maximal force value. When the finger is rolled, one distance will be considerably larger than the other, and which one is larger will indicate the direction towards which the finger is rolled. But when the finger is not rolled, the columns of maximal force will be closer to the center of the contact region. Note that, to facilitate using this algorithm to measure roll, the yaw angle of the image could be calculated, and the image rotated using the value for the angle, so the contact region will be oriented vertically, as described above.

A second exemplary algorithm that exploits the pattern in the force versus column graphs just described is to calculate the skew of the graph, and then to relate the roll value to the skew value; skew is a well-known quantity implemented in many statistical software packages. If needed, the image could be rotated, using the algorithm described earlier, so the contact region is oriented vertically. Also, if needed, the skew values could be smoothed using such techniques as fitting a spline to the force versus column graph before calculating the skew, or applying a windowed linear regression or a median filter to the calculated skew values.

It will be apparent to one of ordinary skill in the art that there are other possible ways to exploit the pattern in the force versus column graphs described above.

Calculating Proximal Parameters from Fingerprint Scanner Images

As discussed supra, a fingerprint scanner or another very high-resolution scanner may be used as the sensor for the HDTP. If such a scanner is used, the images of the finger would have a sufficiently high resolution to discern the whorls of the fingerprint. Although the methods described earlier for calculating the values of the six proximal parameters may be used in those cases as well. Because of the high resolution, patterns of deformations or alterations in the whorls as imaged by the sensor could also be exploited. As taught in Anthony P. Russo, "System for and Method of Determining Pressure on a Finger Sensor," US 2006/0078174, as the finger is pressed into the sensor, the ridges in the whorls grow closer together. And as taught in Anthony P. Russo, "System for and Method of Generating Rotational Inputs," US 2005/0041885, when the finger is subjected to yaw rotation, the rotation of the pattern of ridges could be used to measure yaw. In addition, in Anthony P. Russo et al., "System and Method of Emulating Mouse Operations Using Finger Image Sensors," US 2005/0179657, the use of a fingerprint scanner as a device for emulating a standard mouse is taught.

In one embodiment of the present invention, the HDTP uses a fingerprint scanner or other very high-resolution sensor capable of discerning fingerprint whorls. In addition to measuring heave and yaw by applying the techniques of Russo et al., deformations in the whorls could be used to measure pitch and roll. This could be done by identifying distinctive patterns in the whorl deformations associated with the pitch and roll movements. For instance, since the ridges in the whorls grow closer together as the finger is pressed more firmly against the sensor, when the finger is rolled, the ridges will grow closer together on the side it is rolled towards, and further apart on the other side. Similarly, as the finger is pitched, the ridges will grow closer together in the direction towards which the finger is being pitched, and further apart in the other direction. Note that the distinctive pattern of the whorls could also be used to determine the orientation of the finger in cases in which the pitch of the finger results in a contact region with an essentially circular shape. An exemplary way to do so involves having the user create an image of the finger that can be used as a reference. This could be done explicitly by having the user provide a training image when she first configures the HDTP for use. Alternatively, the image used as a reference could be any elliptical image produced on a particular occasion of use that is determined, using the techniques described earlier, not to result from pitching the finger far forward.

Independent Variation of Parameters

The HDTP can enable a user to vary a large number of independent parameters. In the case of a single finger, for some applications it will be advantageous for the user to be able to vary any one of the six parameters corresponding to the six degrees of freedom of the finger without varying the others. For instance, it may be advantageous for the user to be able to vary the value for pitch without also varying the values for surge, sway, roll, heave and yaw. However, in the case of some of the exemplary parameter calculations described earlier, a change in one parameter will be coupled to a change in another. For instance, rolling the finger will also change the x-coordinate of its geometric center, which may be used to calculate sway. Similarly, pitching the finger will also change the y-coordinate of its geometric center, which may be used to calculate surge. Therefore, for some applications it may be advantageous to implement a decoupling strategy to allow a user to vary the parameters independently.

An exemplary strategy to decouple parameters is based on the following observation. The software functions that implement the algorithms for calculating individual parameters could also be used to tell whether the value of a parameter has changed, simply by seeing whether the value calculated for a given parameter has changed since the last time it was calculated. Similarly, these functions could be used to determine how much each parameter has changed. By looking at the overall patterns of changes in all six proximal parameters, one could assign values to the parameters in such a way that the user could vary each parameter independently of the others.

As an illustration of how this strategy could be implemented, consider how it could be used to enable the user to vary pitch without appreciably varying surge. If the user slides her finger forward without varying its pitch, the y-coordinate of the center of the contact region will change appreciably, but the calculated pitch value will change only minimally. But if she pitches her finger forward, not only will the calculated pitch value change, but so will the y-coordinate of the geometric center of the contact region—in fact, the change in the y-coordinate will track the change in pitch fairly closely. If we consider the patterns of changes in the two values taken together, there are two cases: (1) surge changes appreciably but pitch does not, and (2) surge changes appreciably and so does pitch. Therefore, an exemplary method for enabling a user to vary pitch independently of surge is to take account of the changes in both values: if the calculated surge value changes but the calculated pitch value does not (or changes only minimally), update the surge value; but if both values change, update only the pitch value.

To implement this strategy for decoupling variations in parameters, the following exemplary software architecture, illustrated in FIG. 22 could be used, which isolates the calculations of the parameter values from their assignments as the effective values of the parameters. In this way, the effective values of the proximal parameters, on which the calculations of the distal parameters are based, can be based on the overall patterns of changes in the parameter values that are actually calculated.

It will be advantageous for some applications to modify the strategy just described, since, although it would enable a user to vary each parameter independently of the others, there may well be cases in which the user really does want to vary more than one parameter simultaneously. For instance, she may want to vary both pitch and surge together, by pitching her finger forward as she slides it forward over the surface of the sensor.

An exemplary way to accommodate cases like this, in which the user wants to vary multiple parameters simultaneously, involves assigning threshold values to each parameter, so that the values assigned to a parameter would be updated only if the difference between the current value calculated for the parameter and the last value calculated for it exceeds the threshold. For instance, in the case just described, three cases can be distinguished: (1) surge changes but pitch does not; (2) surge changes and so does pitch, but the change in surge falls below the value assigned as the threshold for surge; (3) surge changes and so does pitch, and the change in surge is at least the threshold value. In case (1) the parameter assignment module would update only the value for surge, in case (2) it would update only the value for pitch, and in case (3) it would update the values for both pitch and surge.

Applications

There are many possible applications for the HDTP. It could be used as a standalone computer peripheral, provide a touchpad for a laptop computer, provide a component of a gaming console, or be an integrated component of a device it is used to control, such as a household appliance or electronic musical instrument. In one notable class of applications, the HDTP is an integrated component of a handheld computing device. Examples of such devices include cell phones or "smart phones," personal digital assistants (PDAs), digital cameras, and remote controls for televisions or home entertainment systems.

The HDTP is well suited for providing a user interface for handheld devices for several reasons. One reason has to do with its capability to measure finger and hand movements that require only a very small control surface. For instance, heave, yaw, pitch and roll movements of a single finger can be carried out on a very small control surface, only slightly larger than a fingerprint. As a result, the HDTP could be used to expand the ways in which a small device can be controlled.

Map Application

In one exemplary application, the HDTP is used to control a map application, used to find the location of a residence, business or other place, or to obtain directions, such as the map applications found in smart phones. The user can zoom out by tapping with two fingers or making a pinching motion with two fingers on the touchscreen; zoom in by double-tapping with a single finger or unpinching two fingers; and pan by translating a finger across the touchscreen right or left, up or down, or a combination. But using the HDTP, the user could carry out the same operations using finger movements. In one embodiment, the user could pan left or right by rolling a finger, up or down by pitching a finger and both ways at once by rolling and pitching the finger at once. To zoom in, the user could increase the amount of applied pressure, and, to zoom out, she could decrease the amount of applied pressure. In addition, the user could rotate the map by using yaw rotation. These operations and the associated finger movements are illustrated in FIGS. 23a-f.

Using these fine movements to control the map application is advantageous for a number of reasons. Because the movements of pitch, roll and heave are finer than surge and sway, and pinching and unpinching, the user could make them more rapidly and with less effort. Because they can be confined to one small part of the screen, they can be used in cases where a control surface has very small dimensions. Also, because they can be confined to one small part of the screen, they occlude the screen to a significantly smaller extent, making it easier for the user to view the map as she navigates it. Because the user can simultaneously vary heave, pitch and roll, she could readily zoom out as she searches for a region of interest on the map, and zoom in when she approaches it. The response of the application to the finger movements could also be made to vary in a non-linear way in response to the movements. For instance, the rate of pan could be exponentially related to the extent of pitch or roll, so that the further she rolls or pitches the finger, the faster the map pans. This could be especially advantageous when combined with zooming via heave for searching for a particular location on the map. For instance, if the user wants to navigate from one location to another, she could decrease the amount of downward pressure to zoom out so she could see a larger area on the map, and roll the finger significantly to pan at a high rate of speed. As she approaches a location of interest, she could decrease the extent of the roll rotation to slow the rate of pan, and increase the amount of downward pressure to zoom in. Clearly, panning and zooming in this way, rather than by laterally and vertically translating a finger, pinching and unpinching, and so on, is much faster and efficient, simply because the movements are much smaller. Further, the fact that the movements used to zoom and pan could be carried out simultaneously, so the user could pan as she zooms, provides a very natural way for the user to search for a specific location.

It should be noted that enabling the user to pan and zoom in the way just described does not preclude retaining the existing ways of zooming and panning in a smart phone—there could be multiple ways provided for carrying out the same functions. But it could be particularly advantageous to assign different functions to different kinds of movements. For instance, assigning a pan function to translating the finger laterally and vertically could be retained, with pitch and roll assigned to panning at a higher rate of speed, or at a rate exponentially related to the extent of the tilts. The different kinds of movements could also be assigned to completely different functions. For instance, when the finger is translated laterally, a menu is displayed in response to touching an icon at the bottom of the screen. In this menu, the user could select from among, for example, "Drop Pin," "Show Traffic,"

"Map," "Satellite," "Hybrid" and "List." Using the HDTP, surge or sway movements could display the menu, with subsequent surge or sway movements used to select one or another menu items. Similarly, pinching and unpinching could be assigned additional functions, and icons could be provided at the bottom of the screen that provide additional functions. In this way, the number of operations made available to the user in the map application without having to navigate to a different screen could be considerably increased.

FIG. 24 shows an exemplary architecture for the map application. Although the parameter values could be calculated in a number of different ways, using a number of different algorithms, one exemplary way to do so is to use the same architecture for calculating parameter values described earlier, which is shown in FIG. 8. Also, while the image preprocessing module could be implemented in a number of ways, one exemplary way to do so is shown in FIG. 9. FIG. 25 shows exemplary pseudo-code that could be used as a basis for implementing the map program. In the main( ) function, there is a loop that repeatedly gets a frame of data from the sensor by calling getframe( ), applies image processing operations to the frame by calling procframe( ), calculates parameter values from the processed frame by calling procframe( ), and displays the map bitmap by calling update map( ). The function updatemap( ) uses the heave value to set the zoom level, the yaw value to determine how far to rotate the bitmap, and the roll and pitch values to pan the image. The image is then displayed in the specified window by calling putbmp( ). Note that the heave, yaw, roll and pitch values can be subjected to scaling, smoothing or other operations before being used to manipulate the bitmap.

Figure 26:
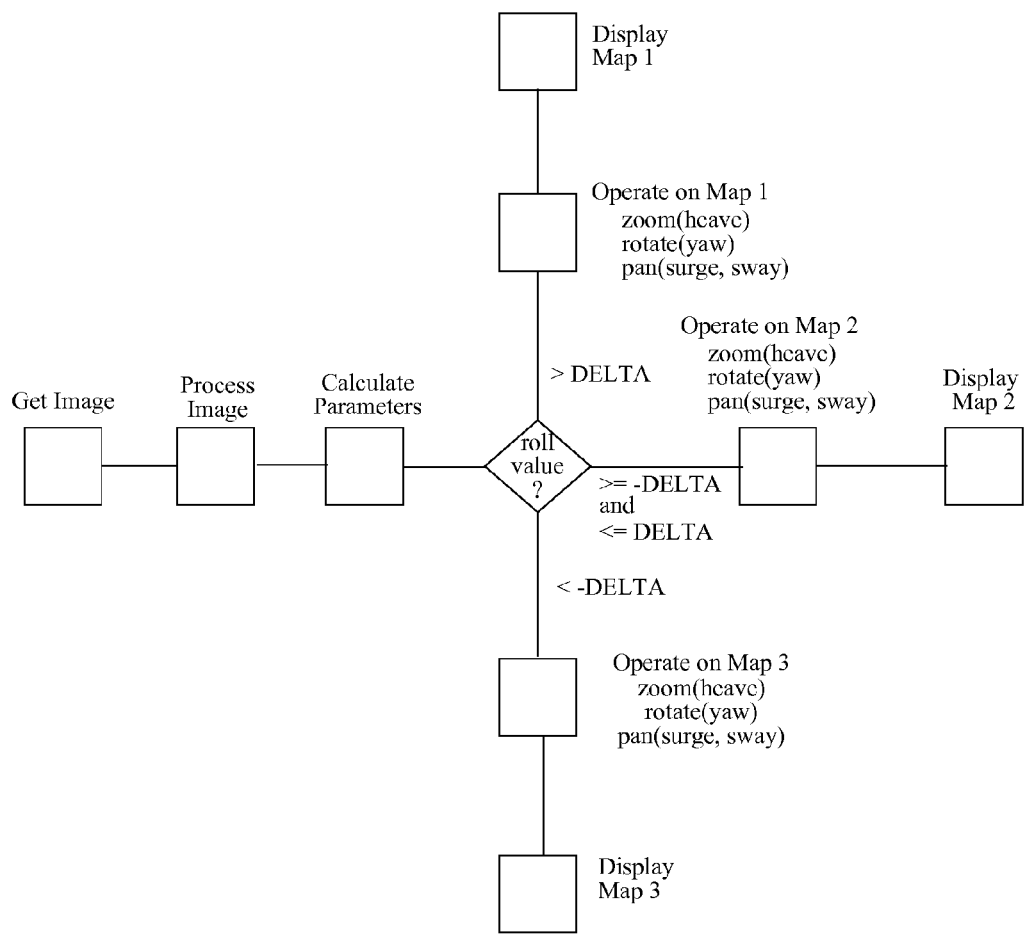
FIG. 26 is a block diagram illustrating an exemplary architecture that could be used to allow a user to determine which of three different maps would be displayed by rolling a finger to three different extents.

A block diagram illustrating an exemplary architecture that could be used to allow a user to determine which of three different maps would be displayed by rolling a finger to three different extents is shown in FIG. 26. As shown, after the parameter values are calculated, the value obtained for roll is evaluated. Depending on whether it exceeds a first threshold (DELTA), falls below a second threshold (−DELTA), or falls in between, one of three maps is selected to be operated on and displayed. In all three cases, the selected map is operated on by zooming to an extent responsive to the heave parameter, rotating to an extent responsive to the yaw value, and panning to an extent responsive to the surge and sway values. The transformed map is then displayed, and the sequence is repeated.

It will be apparent to one of ordinary skill in the art that different movements and parameters could be used to select the maps, and that the architecture shown for the map application could be readily adapted for a large number of different implementations of the map program, as well as for a large number of other applications, including many of the other applications described herein.

Web Browser Application

Figures 27A, 27B, 27C:
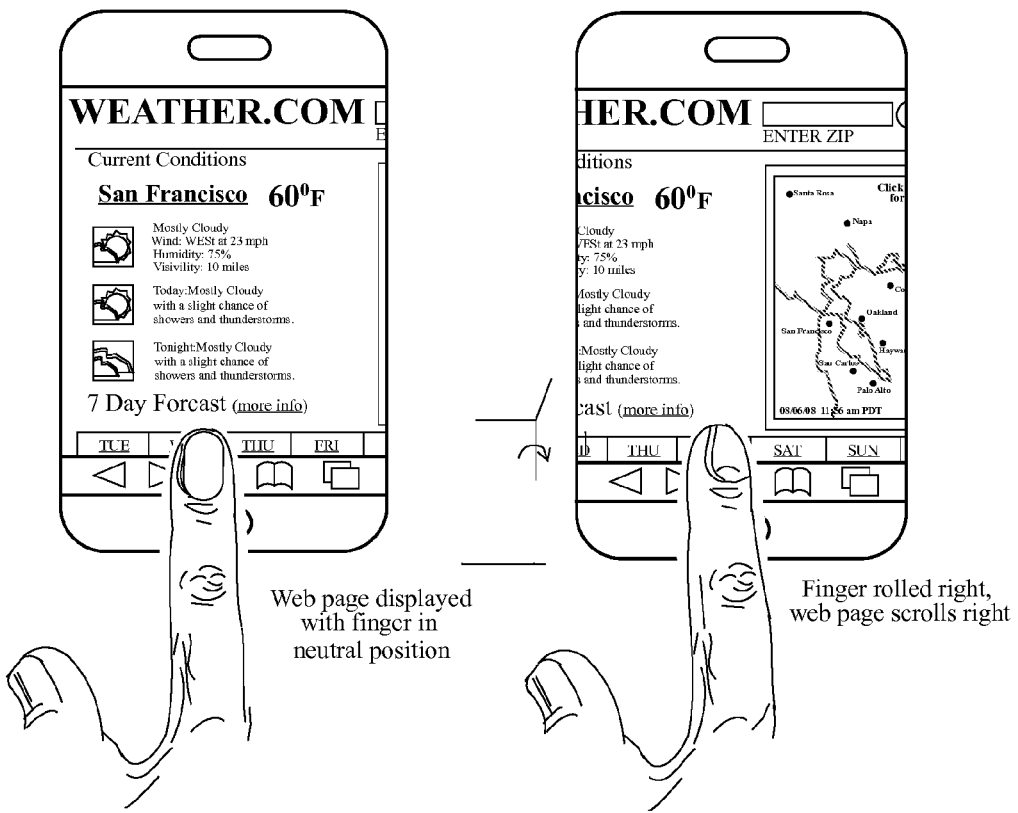
FIGS. 27a-27c depict exemplary operations to pan a web page.

In another exemplary application, the web browser of a handheld device is responsive to the movement of a finger in all six degrees of freedom. In one exemplary implementation, pitch and roll are used to pan, and heave to zoom. As in the case of the map application just described, using pitch and roll for pan is advantageous because it occludes the display to a significantly lesser extent than surge and sway translations; and, by combining pitch and roll with heave to zoom, it provides an advantageous way to find a particular location in a web page. The panning operations are illustrated in FIGS. 27a-c.

Another example of how the functionality provided by the HDTP could be advantageous in operating a web browser for a handheld device concerns selecting a link. The region of the screen which the user must touch to select a link can be quite small, and there can be other links in close proximity to the link the user wants to select, making it difficult to select the desired link. In the smart phone, the user can make the link easier to select by unpinching the fingers to zoom in. However, because this requires separate, independent movements, it is clumsy, and can be distracting, because of the relative complexity of what the user must do to make selecting the link possible.

Figure 28A:
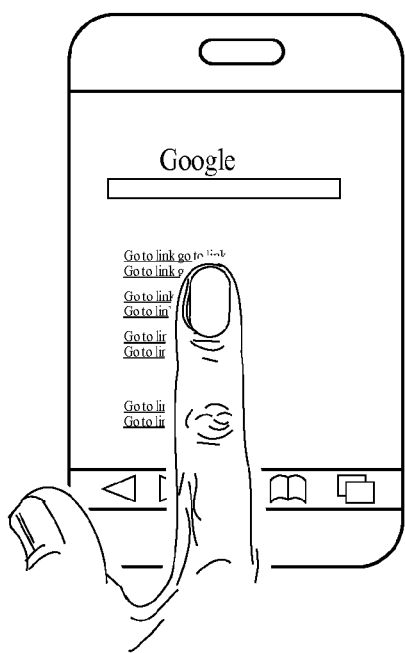
FIGS. 28a-28c depict exemplary operations to zoom and select a web link.
Figure 28B:
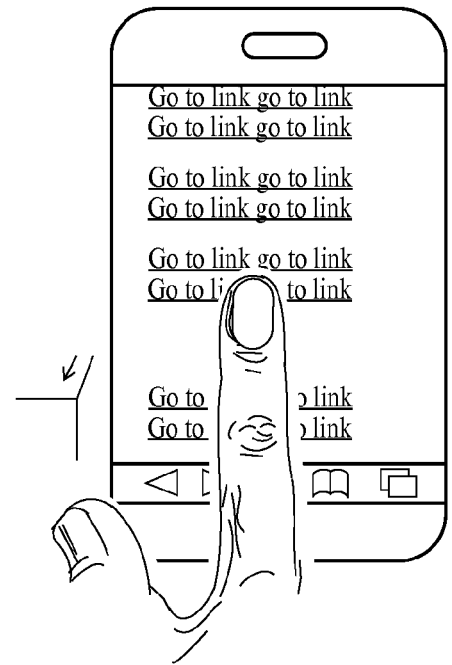
Figure 28C:
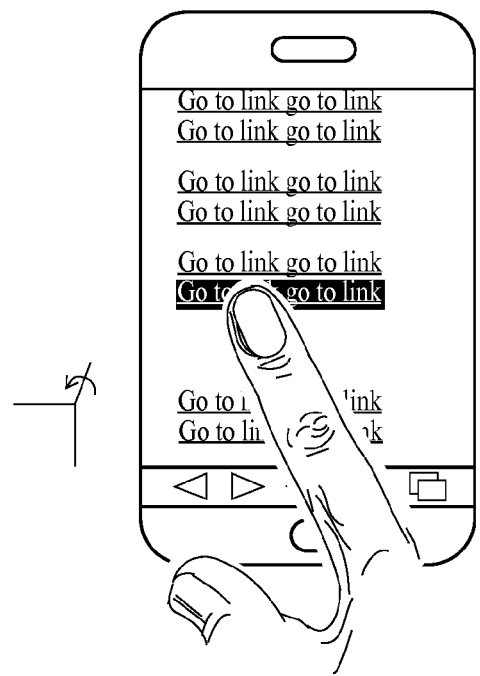

The present invention, however, makes it possible to select a link in much more efficient and natural ways. One exemplary way to do so is for the user to zoom in on the link by pressing down on the region of the screen that includes the link. Then, when the link is sufficiently large so she can put her finger on it without also putting it on neighboring links, she could use a slight yaw rotation to select it. This sequence of operations is illustrated in FIGS. 28a-c.

Another way in which the present invention can be advantageous for using a web browser involves navigating across web pages. In the case of the smart phone web browser, one can navigate from the page being viewed to a page recently viewed by pressing an icon at the lower right of the screen. Doing this changes the display, so the current web page is reduced in size to fit well within the display, and the other web page can be navigated to and selected by dragging a finger to scroll laterally.

Figure 29A:
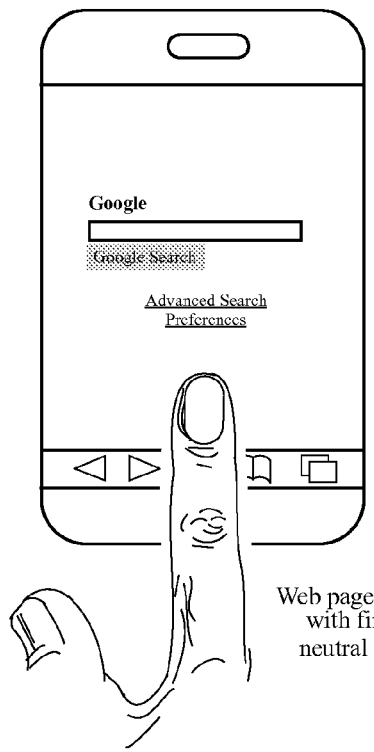
FIGS. 29a-29d depict exemplary operations to switch between web viewing modes.
Figure 29B:
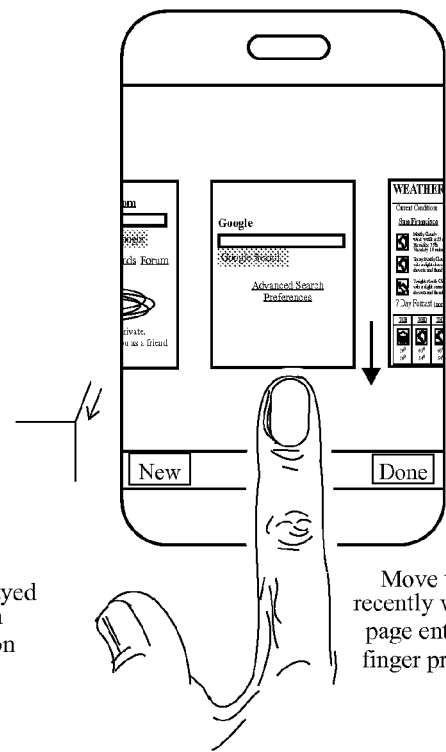
Figure 29C:
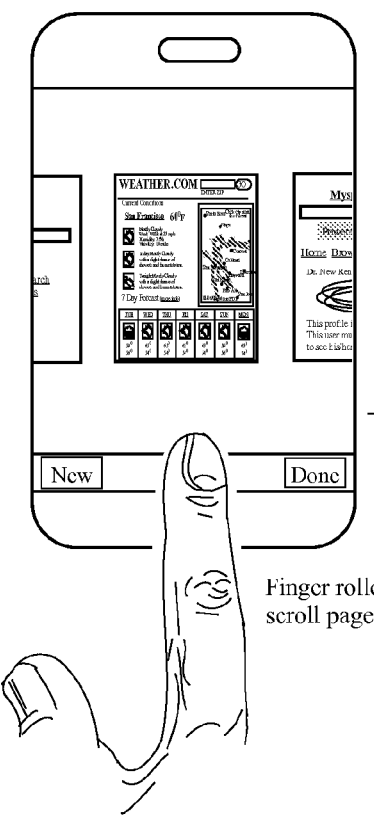
Figure 29D:
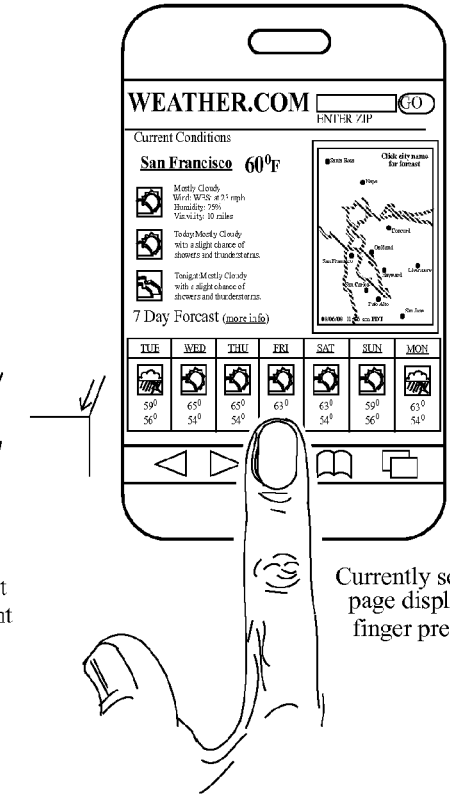

An exemplary, advantageous alternative method for navigating to and selecting web pages made possible by the present invention is the following. Rather than having to translate the finger across the screen and press an icon or button in a particular part of the screen, as in existing systems, one could use a distinctive kind of movement made possible by the HDTP, such as yawing the finger or increasing the applied pressure, to switch between a mode to view web page and a mode to select a web page. FIGS. 29a-c illustrate an exemplary way that this could be done. The user enters page selection mode by momentarily increasing the applied pressure, and then rolls her finger to navigate to the desired page. When the desired page is reached, the user returns to page viewing mode by momentarily increasing the applied pressure again. Note that, as will be evident to one of ordinary skill in the art, many different kinds of movements could be used to switch between different modes, this general technique could be used to switch between more than two modes, and this general technique could advantageously be used for a wide variety of different applications.

Figure 30A:
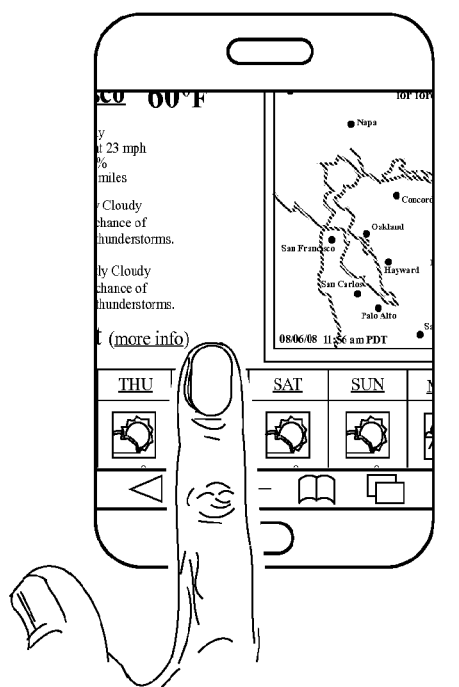
FIGS. 30a-30c depict exemplary operations of assigning roll movements for navigating across web pages.
Figure 30B:
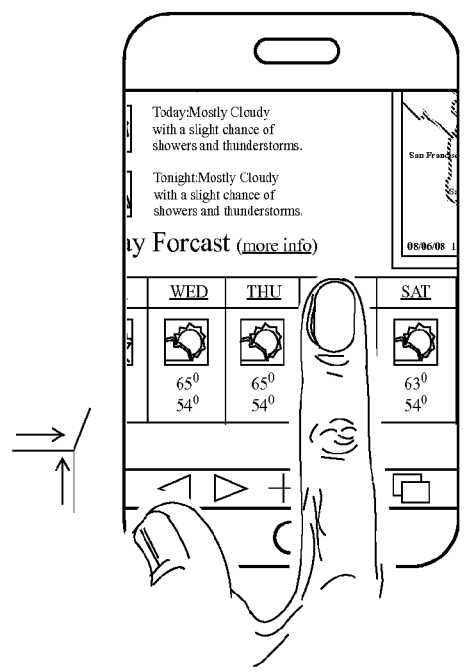
Figure 30C:
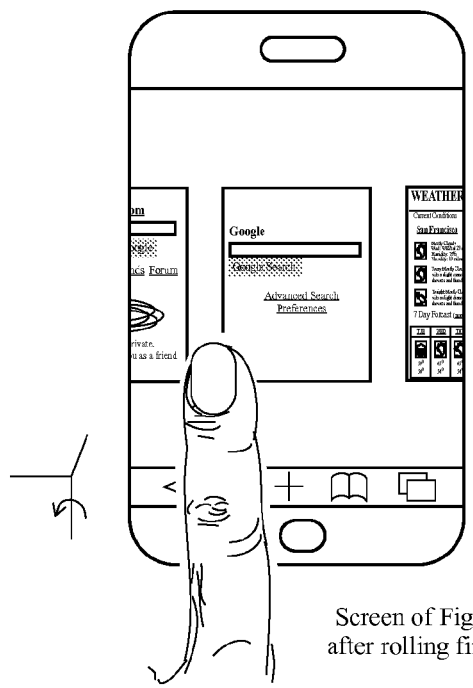

In the preceding example, the user explicitly changes modes by carrying out a specific kind of movement, which is reserved for that purpose. An advantageous alternative is to enable the user to switch modes implicitly, by assigning one set of movements to viewing a web page, and another set to navigating across web pages. One exemplary way to do so involves assigning roll movements for navigating across web pages. This assignment is illustrated in FIGS. 30a-c. For instance, as a user rolls her finger to the right, web pages that she had viewed subsequently to viewing the current page could be displayed in turn, and as she rolls her finger to the left, web pages that she had viewed prior to viewing the current page could be displayed. If needed to avoid inadvertently switching to the page selection function from the page viewing function, the user can precede the roll by, for example, a slight pitch movement or a slight yaw movement. In an exemplary alternative method, to enter page selection mode a change in the extent of the roll movement could be required that is sufficiently large to avoid inadvertently entering page selection mode by making a slight roll movement; or placing a second finger, either of the same hand or the other hand, on the touchscreen could be required.

Providing a way for the user to implicitly switch modes can make operating a system even more efficient than reserving a specific kind of movement to switch modes, since the movement needed to explicitly switch modes is eliminated. Note that this general technique for implicitly switching modes could be implemented using many different assignments of movements to operations, used to switch between more than two modes, and used for a wide variety of different applications.

To facilitate selecting web pages, when the user enters page selection mode by rolling her finger, outlines of the web pages could appear, either in place of the page she is currently viewing, as in a smart phone browser, or overlaid on top of the page she is currently viewing. Note that if rolling the finger is reserved, instead, for laterally panning the page she is viewing, then another finger or hand movement could be used.

The last two examples illustrate how the sensitivity of the HDTP to a multiplicity of different kinds of movements could be advantageously utilized to superimpose multiple, independent control surfaces on a single physical surface. Instead of requiring an explicit operation to change screens to carry out two distinct sets of operations, by assigning, for instance, one set of operations to surge and sway movements, and another set to roll movements, the burden of having to carry out a separate operation to switch between screens is eliminated.

It should be noted that—as will be evident to one of ordinary skill in the art—there are many different ways in which types of movements could be assigned to operations to provide multiple, independent control surfaces superimposed on a single physical surface. For instance, roll in the previous example could be supplemented with pitch to enable a user to select web pages in a two-dimensional array of web pages instead of the one-dimensional array just described. In another exemplary assignment of movements to operations, surge and sway are assigned to a first virtual control surface, pitch is assigned to a second virtual control surface, and roll is assigned to a third virtual control surface, enabling the user to operate on three virtual control surfaces using a single physical surface without requiring any explicit operations to specify which control surface is being operated on. In yet another exemplary assignment of movements to operations, different levels of downward pressure are associated with different control surfaces—for instance, a light pressure could be used to navigate within a web page, and a heavier pressure to navigate across web pages. It will be evident to one of ordinary skill in the art that these are just a few of many possible examples.

Music or Video Player Application

In another exemplary application of the HDTP, it is used to operate an MP3 or other music player, or a video player. In one embodiment, the user selects the current position in a song being played by using roll or yaw movements. This could be realized in many different ways. To give one example, a yaw rotation to the right is used to fast forward the song, and a yaw rotation to the left to rewind it, and the extent of the yaw movement could determine the new position in the song. To give a second example, the song could be fast forwarded or rewound for as long as the user's finger is yawed, respectively, to the right or to the left, with the extent of the yaw rotation determining the speed at which the song is fast-forwarded or rewound.

To adjust the volume the user could, for instance, vary the pitch tilt or the amount of downward pressure. In a way analogous to how the user can navigate from one web page to another in an earlier example, the user could navigate among the screen displaying all playlists, the screen displaying the current playlist, and the screen showing the currently played song by rolling her finger.

Another exemplary way in which the HDTP could be advantageously used in a music player is to select whether a playlist or song is to loop. In the smart phone, this is selected using a tri-state control. The user taps once on a small icon to repeat a playlist, a second time to repeat a song, and a third time to disable the repeat function altogether. With the next tap, the cycle begins again. By contrast, using the HDTP, the user could select each of the three states by rolling her finger—for instance, rolling all the way to the left to repeat the playlist, rolling all the way to the right to repeat the song, and a neutral roll to disable the repeat function. To distinguish the neutral roll used to suppress looping from a neutral roll used to carry out other operations, the movements used to set the loop control could be preceded by a yaw rotation, or they could be carried out on a marked partition displayed on the screen.

It will be apparent to one of ordinary skill in the art that there are many uses for tri-state controls, and that the technique just described for setting a tri-state control, and related methods using, for instance, yaw or heave, could be used to set a tri-state control. Further, with sufficiently high accuracy, the techniques described to set a tri-state control could be extended to set controls with greater than three states or discrete levels.

Another exemplary way in which the HDTP could be advantageously exploited to operate a music player involves the operation of icons that appear at the bottom of the screen, which could be used to carry out dedicated functions. In carrying out certain operations, such as dragging a finger from the vicinity of the top of the touchscreen to the vicinity of the bottom or vice versa to scroll through a list of songs, the user may inadvertently touch one of the icons, causing an unintended operation to be carried out. The HDTP could advantageously be used to minimize the likelihood this will happen. For instance, by requiring a relatively heavy pressure to select an icon, inadvertently touching it when scrolling will be less likely to select it. To give a second example, a touch to select an icon could be distinguished from a touch used for scrolling by requiring a slight yaw rotation to select the icon.

It will be apparent to one of ordinary skill in the art that there are many related ways to distinguish a touch used to select an icon from a touch used to carry out other operations. It will also be apparent to one of ordinary skill in the art that this is a technique that could be applied in many different contexts to minimize the effects of inadvertently touching particular parts of a screen associated with specific operations when using the finger to carry out other operations.

Figure 31A:
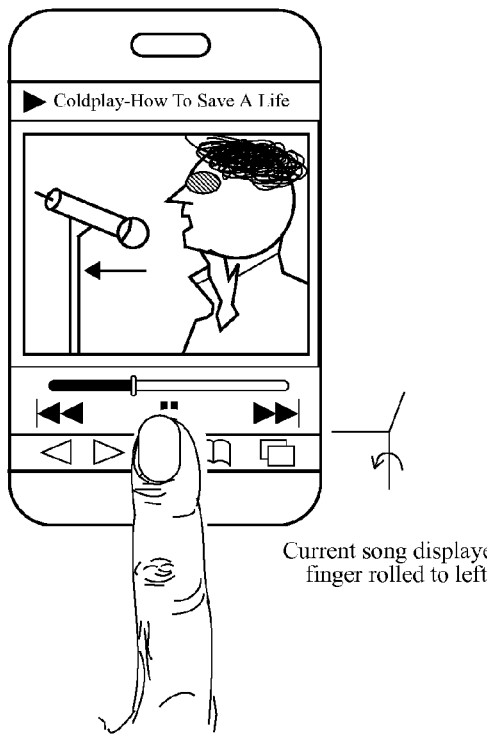
FIGS. 31a-31g depict exemplary operations of navigating music player screens.
Figure 31B:
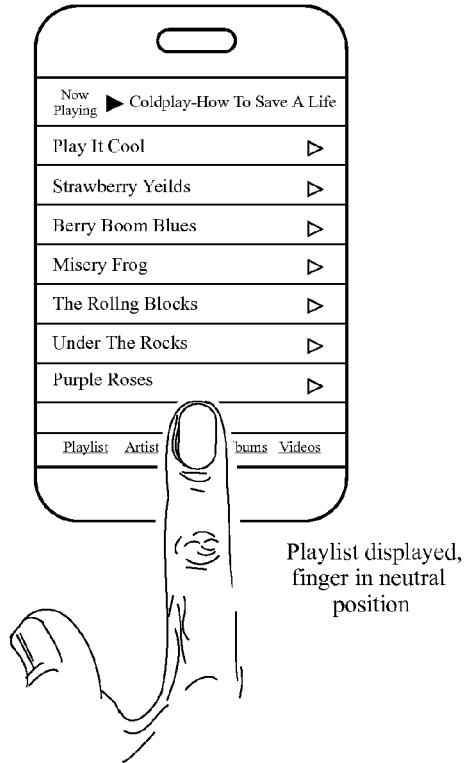
Figure 31C:
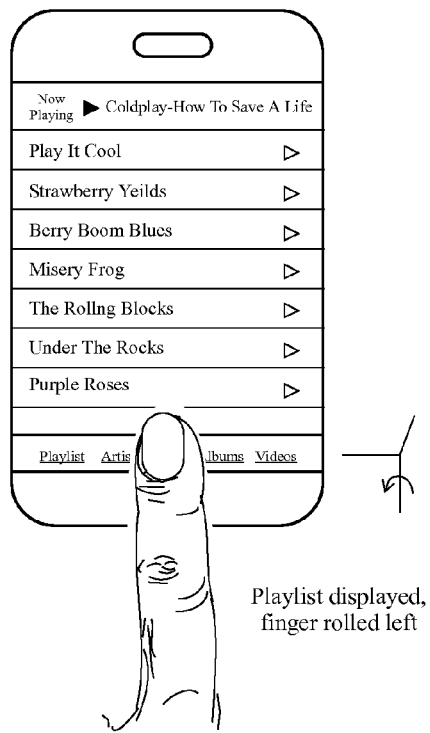
Figure 31D:
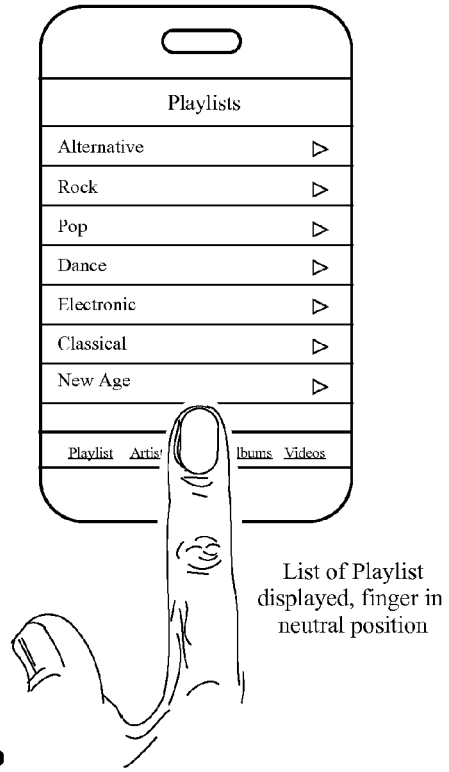
Figure 31E:
Figure 31F:
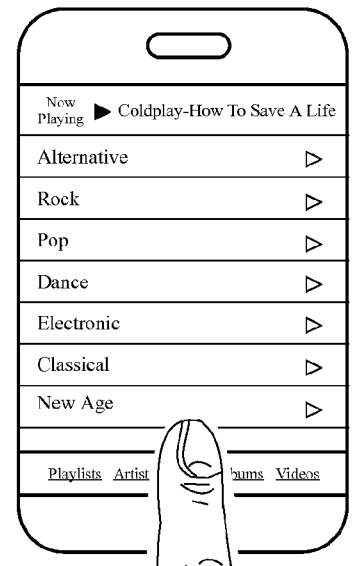
Figure 31G:
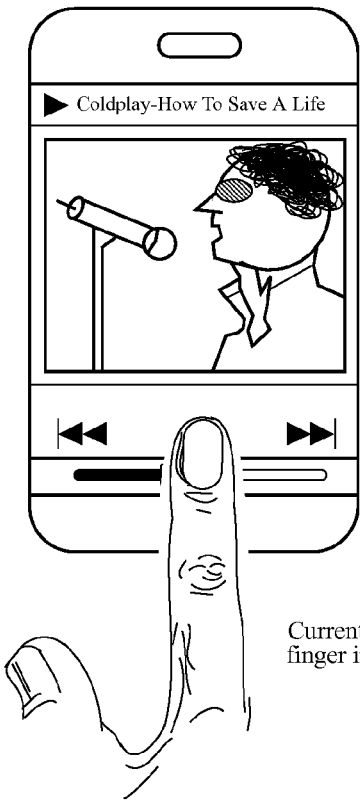

Another exemplary way in which the HDTP could advantageously be used to operate a music player is illustrated in FIGS. 31*a-g*. In this case, the HDTP facilitates switching between screens at three different levels of a hierarchy, comprising the sequence: (1) a list of playlists, (2) a list of songs in the current playlist, (3) the currently selected song in the current playlist. In FIG. 31*a*, the user rolls her finger to the left when the currently selected song is displayed, which results in the list of songs in the current playlist being displayed, shown in FIG. 31*b*. In response to a second roll to the left, shown in FIG. 31*c*, a list of playlists is displayed, shown in FIG. 31*d*. In response to a first roll to the right, shown in FIG. 31*e*, the list of songs in the current playlist is displayed again, shown in FIG. 31*f*. Finally, in response to a second roll to the right, also shown in FIG. 31*f*, the current song is displayed once again, as shown in FIG. 31*g*.

It will be apparent to one of ordinary skill in the art that the exemplary ways of carrying out operations on music players described herein can also be used to carry out corresponding operations on video player applications, as well as corresponding operations in many other applications.

Voicemail Application

Figure 32A:
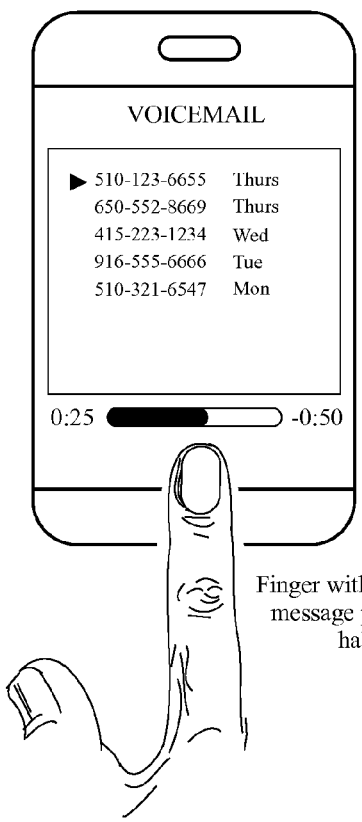
FIGS. 32a-32c depict exemplary yaw operations to select a position in a voicemail message.
Figure 32B:
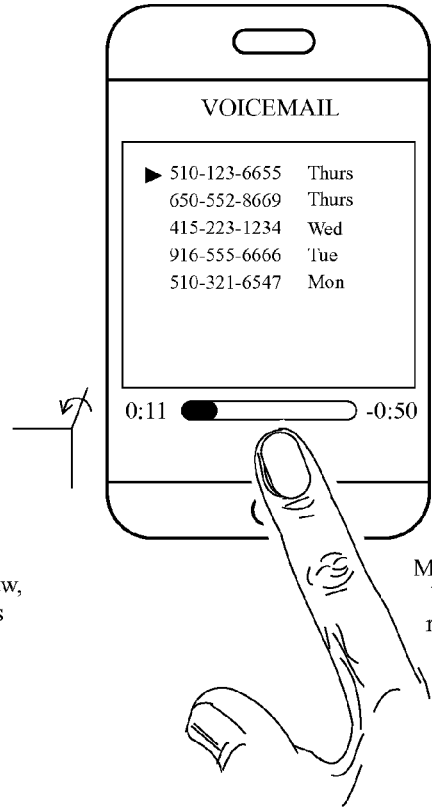
Figure 32C:
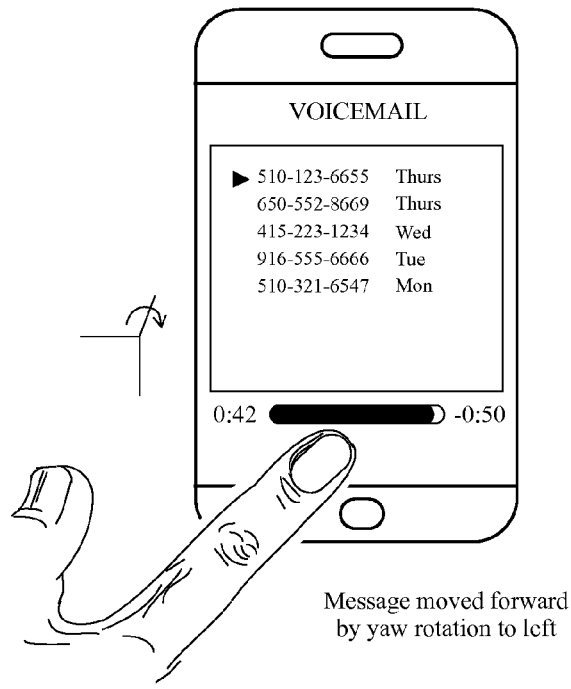
Figure 33A:
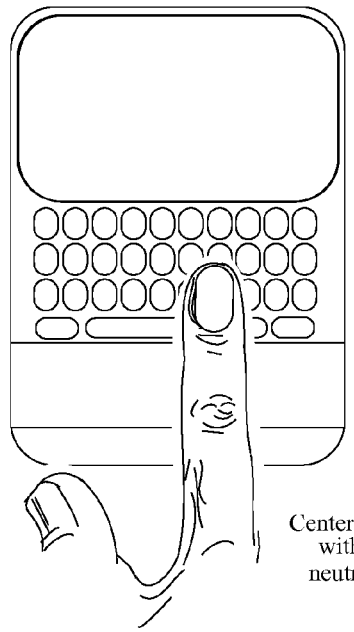
FIGS. 33a-33d depict exemplary pitch and roll operations to select keys of a virtual keyboard.
Figure 33B:
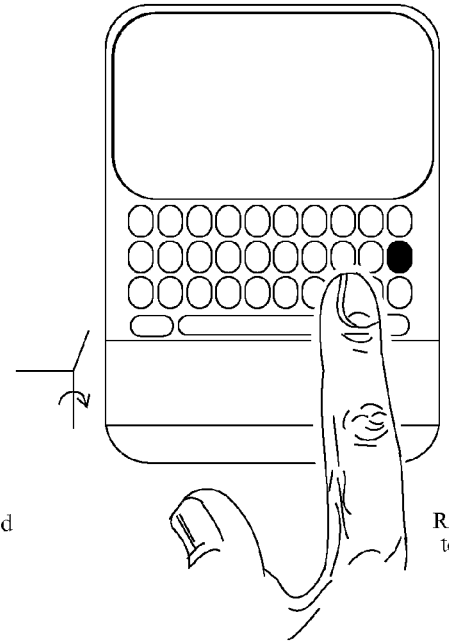
Figure 33C:
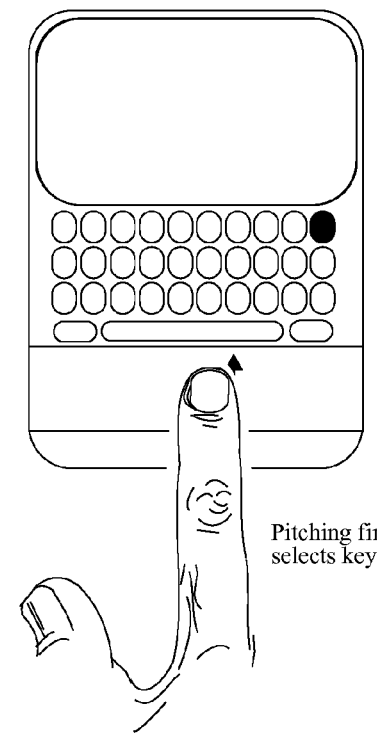
Figure 33D:
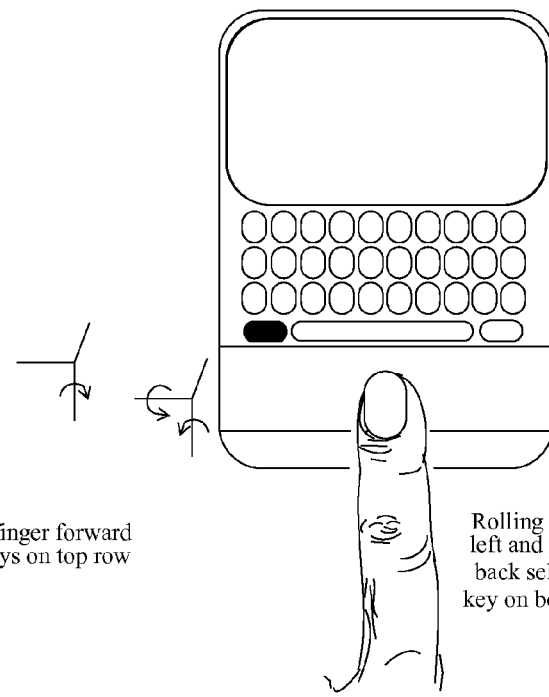

In another exemplary application of the HDTP, it could be used to operate a voicemail application. It will be evident to one of ordinary skill in the art that many of the techniques described herein could advantageously be applied to the operation of the voicemail application. To give one of many possible examples, yaw rotation could be used to specify the particular part of a voicemail message to be played, as shown, in FIGS. 32a-c. It will be clear to one of ordinary skill in the art that this general technique has a wide range of applications—for instance, it could be used to specify the particular part of a song or video to be played.

Email Application

In another exemplary application of the HDTP, it could be used to operate an email application. It will be evident to one of ordinary skill in the art that techniques such as those described herein to facilitate scrolling and switching among screens, as well as for many other operations, could be used here as well—for instance, pitch could be used to scroll through a list of emails in a mailbox, and roll could be used to switch among the screen used to select mailboxes, the screen used to select messages in the selected mailbox, and the screen displaying the text of the selected message.

Text Entry and Operation of On-screen Virtual Keyboards

An advantageous way in which the HDTP could be used is to facilitate the operation of a virtual, on-screen keyboard, such as that found on a smart phone. Such on-screen keyboards are found by many users to be difficult and inefficient to use, particularly for users with large fingers. Therefore, ways in which the HDTP could make the keyboard easier to use are of particular utility. (It will be clear to one of ordinary skill in the art that, although this discussion of ways in which the HDTP could improve the operation of an on-screen keyboard occurs in the context of composing and editing email messages, the principles presented here are generally applicable to any context in which an on-screen keyboard is used.)

One difficulty faced by the user of the keyboard is hitting the right key, since the keys are small, and—so the entire QWERTY keyboard can fit on a single screen, emulating a standard keyboard used with a desktop or laptop computer—the virtual keys are compressed into a small area with little space between the keys. Although existing virtual keyboards do not recognize pitch and roll as distinct kinds of movements, the user may nevertheless be able to exploit those movements to select keys neighboring one that has been selected, since those movements shift the location of the main part of the contact region to neighboring keys. However, this technique is of limited utility, since only keys lying close to the original region of contact can be selected, and the display indicating which key is selected is occluded in some cases. In the case of the smart phone or similar devices, an alternative is to slide the finger to select different keys, since those devices do not enter a character until the user releases a key by lifting the finger off the surface of the touchscreen. However, this is inefficient, and the display of the currently selected character may be occluded. The situation is made more complex, and creates more of a problem, because of the way diacritical marks are selected: the user must press and hold a key momentarily, which will bring up a menu providing various diacritical marks for the associated character. This function can interfere with sliding the finger as a way to choose the correct character.

The HDTP provides ways to make selecting the desired character easier. For instance, rather than pressing and holding a character to make available associated diacritical marks, the menu could be brought up in response to a yaw rotation. A generalized capability to select characters in response to, for instance, pitch and roll movements could also be implemented, so the user could select any key on the keyboard, rather than just the keys under the contact region of the finger. An exemplary way to implement this is to allow the user to select an arbitrary key by pitching and rolling a finger, where increasing or decreasing the extent of the pitch and/or roll tilts selects a key that is, respectively, further from or closer to the region of contact. This can provide a more efficient way to select keys, and particularly to recover when the wrong key has been pressed, than using the keyboard as it is currently implemented. In particular, when pitch and roll are combined with sliding, the user can much more easily and rapidly select the desired key. Further, since the finger need not be directly over a key to select it, there is less of a problem with occluding keys by the fingers when the keys are being selected by the user. This is illustrated in FIGS. 33a-d, in which pitch and roll are used to select particular keys of a keyboard without occluding any of the keys. It will be apparent to one of ordinary skill in the art that, although in this example pitch and roll movements are used to select keys, many other kinds of movements could be used, and that the same operations could be carried out with the finger occluding some of the keys.

Another exemplary way in which the HDTP could be advantageously employed to enter characters has to do with the operation used to accept a character. The smart phone enables the user to tell which key is being pressed by displaying the corresponding character on the screen. However, characters are not accepted, and so are not added to the entered text, until the user releases the virtual key by lifting her finger off the screen. By making the operation of selecting a character separate from the operation of accepting it, the user can tell which character is currently selected without entering it, thus reducing errors due to inadvertently selecting the wrong key. Using the HDTP, selecting and accepting characters could be carried out in a related way, with the user selecting characters by touching the corresponding keys of the on-screen keyboard, and accepting a character by, for instance, quickly and momentarily increasing downward pressure, rolling to the right or left, yawing to the right or left, or pitching forward or back. Accepting characters in one of these ways provides an advantageous, more efficient alternative to lifting a finger off the touchscreen, since they could be carried out more quickly and with less effort.

Another source of inefficiency in using an on-screen keyboard has to do with switching virtual keyboards. In the smart phone, there are two separate virtual keyboards, one for letters, and another for numbers and a limited selection of symbols, which, in some contexts, is supplemented with a third keyboard providing more symbols. To change which keyboard is selected, the user must press a virtual key at the bottom of the screen. This is inefficient and tedious, particularly when entering text that incorporates a mixture of letters, numbers and symbols.

Figure 34A:
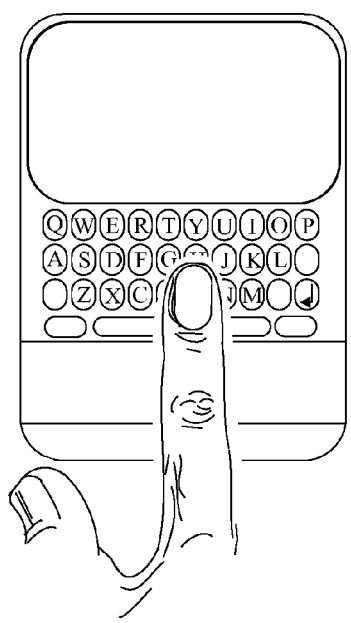
FIGS. 34a-34b depict exemplary pitch operations to select one of a plurality of virtual keyboards, for example, between letters and numbers.
Figure 34B:
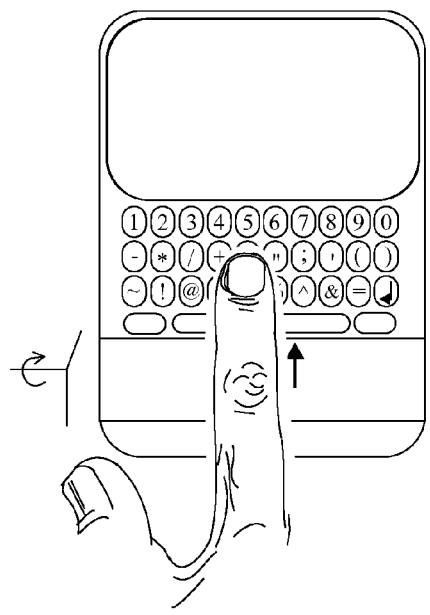

The capabilities of the HDTP could be exploited to make switching virtual keyboards less cumbersome and more efficient. If pitch is not assigned to selecting individual keys, the extent of the pitch tilt could be used to determine which keyboard is selected. For instance, when the finger is pitched back, in a resting or neutral position, the main keyboard, for entering letters, could be selected. When pitched further forward, the number-symbol keyboard could be selected, and when pitched even further forward, the keyboard providing additional symbols could be selected. To make selecting keyboards easier, which keyboard is displayed could change to reflect which keyboard is currently selected, thus providing visual feedback to the user. FIGS. 34a-b illustrate using pitch to switch from a letter keyboard to a number-symbol keyboard, with the display updated to reflect which keyboard is active. In addition, lower- and upper-case letters could be associated with different extents of the pitch displacement, or the amount of downward pressure could be used to select the case of the selected letter. Alternatively, if pitch is reserved for selecting individual keys, yaw rotation or downward pressure could be used to select keyboards. It will be apparent to one of ordinary skill in the art that there are a large number of variations in the ways in which different kinds of movements that the HDTP can recognize could be assigned to selecting keys and keyboards.

Another way that using the keyboard could be made more efficient is through the well-known technique of word completion. In word completion, as the user types a word, a word is displayed that starts with the same letters the user has entered for the word so far. Which words are selected in response to given sequences of letters typed could be based on, for instance, statistical regularities observed for the individual user, or for a collection of users. If the appropriate word is displayed, the user could select it by pressing, for instance, the space key or the return key, thus obviating the need to type in the remaining letters. Although word completion can enable the user to enter text more efficiently, it is of limited utility since the user has one word to select from, and the word provided may not be the one the user intends; this is especially likely when only a small number of letters, at the beginning of a word, have been entered, since the possible words will be only loosely constrained.

The HDTP provides a basis for implementing a more general and efficient word-completion strategy. In one embodiment, the HDTP enables a user to view and scroll through a list of words, all beginning with the letters typed so far for the current word, by tilting or rotating her finger. For instance, in response to a yaw movement, instead of displaying a single word, several words could be displayed that all begin with those letters. The user could then scroll down the list of words to reveal others by, for instance, rolling her finger to the right, and scroll up to display again words that had earlier been displayed by rolling her finger to the left. Then she could choose a word by, for instance, lifting her finger off the touchscreen, making a yaw rotation or momentarily increasing the applied pressure.

Figure 35A:
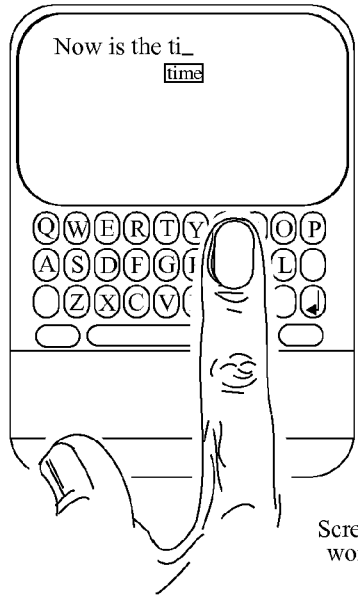
FIGS. 35a-35b depict exemplary operations for activating and using a word completion and selection function used in text generating applications.
Figure 35B:
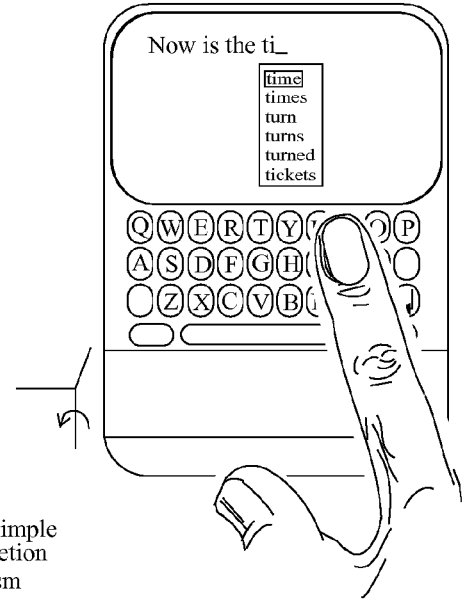
Figure 35C:
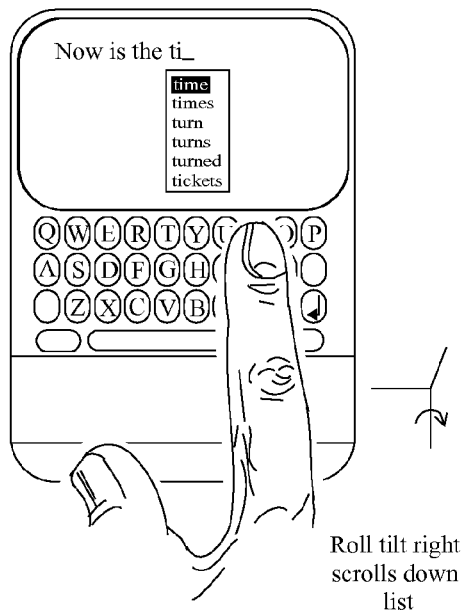
FIGS. 35C-35D further depict exemplary operations for activating and using a word completion and selection function used in text generating applications.
Figure 35D:
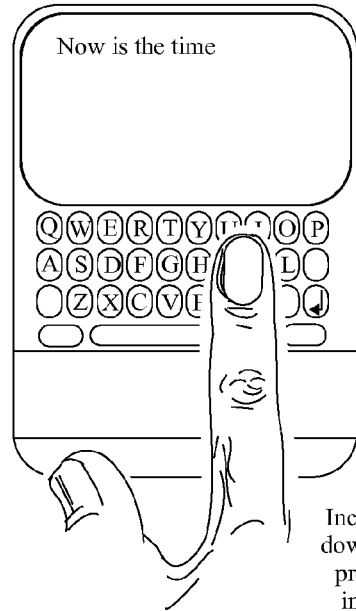

FIGS. 35a-d illustrate screen displays that could appear to facilitate the use of a general word-completion mechanism of the sort just described. In FIG. 35a, a display for a simple word completion mechanism is shown such as that used in the smart phone. This mechanism could be retained for an application based on the HDTP as the default word completion mechanism. FIG. 35b shows a list of words, all beginning with the letters typed in so far for the current word, that could appear in response to, for example, a yaw rotation. Note that the top word is currently selected, indicated by the box around it. FIG. 35c illustrates the operation of scrolling down the list of words to select a particular word, which could be carried out in response to a roll movement. Finally, FIG. 35d shows the insertion of a word selected from the list in the text, effected by, for instance, a yaw rotation.

There are many possible methods that could be used to determine what words should populate the list, and in what order they should occur. For instance, they could be all the words contained in a system dictionary, words the user has recently used, words in the current document, words in all the documents ever created using the current application, words entered in all documents ever created in all applications, words the user explicitly designates as ones to be provided, words in a particular English-language dictionary, and so on. The order in which they appear could, for instance, be alphabetical, based on the frequency of use by the user across all applications, in a specific application, in the current document, and so on.

There are many other ways in which the HDTP could be exploited to make text and character entry more efficient. For instance, the user could repeat a character by applying a pressure exceeding a certain threshold. Once the threshold has been exceeded, further variations in pressure could be correlated with the speed at which the repeated character is entered. The HDTP could also be exploited for document formatting. For instance, a yaw movement could be used to indicate that the text that follows is bold or italicized. It will be apparent to one of ordinary skill in the art that these are just a few of many possible examples that could be given.

Painting Application

Another exemplary application of the HDTP is for a drawing or painting application. In one embodiment, the user can create full-color on-screen paintings, which could be saved to a file, transmitted via a network, and so on. A palette could be provided at the bottom of the screen that could be used to select colors. The capability of the HDTP to pick up nuances of finger movements could be utilized to allow users to use their fingers to create a variety of subtle effects, as the following examples illustrate. The user could vary the width of a line created by moving a finger on the screen by varying the amount of downward pressure. The user could select a color from the palette by touching it in the palette, and then touching the screen to use that color when painting with her finger. To blend colors, the user could touch a first color in the palette with a finger rolled to the left, and a second color with the same finger rolled to the right. Then to vary the relative amounts of each color that will be applied when she moves her finger on the screen, the user could roll the finger to varying extents—for instance, rolling all the way to the left could apply the pure color selected when the finger was rolled to the left, rolling it all the way to the right could apply the pure color selected by rolling the finger all the way to the right, and rolling it to an extent between the extremes could apply a color with a mixture of the two colors proportional to the extent of the roll, so that when the finger is rolled neither to the right nor to the left the color applied will be the color created by mixing the two original colors in equal proportions.

Another advantageous way to apply colors would be to assign different colors to different fingers by using a fingerprint recognition capability that could be incorporated into the HDTP. When the user selects a color with a finger, the distinctive pattern of ridges of that finger could be associated with the color, so that different colors could be associated with different fingers. Particular kinds of movements made with one finger could be used to carry out control functions rather than to create the images per se—for instance, yaw could be used to set the zoom level. It could be advantageous, however, to use only movements or gestures made with more than one finger at once for control functions, so that movements of single fingers could be reserved for creating the image—for instance, if zoom is adjusted with a two-finger movement, then the user could vary yaw in the course of creating images without having to worry about changing the zoom level.

A drawing or painting application of this sort could be used to create a finished drawing or painting. However, when implemented in a small, portable or handheld device, it may prove particularly advantageous in providing an artist with a portable electronic sketch book that could be used to make quick sketches or renderings of scenes or objects that could be used as a basis for more polished art works.

Heightened Sensitivity

Another way that the capabilities of the HDTP could be utilized to improve the functioning of a device is to provide heightened sensitivity to touch. A tactile sensor or fingerprint scanner, for instance, could detect a light touch that loads only a few sensing elements. As a result, using an HDTP in place of a conventional touch interface could make a device more effortless to use, as the following example illustrates. In the smart phone, when it has been idle for a while, the user must slide a virtual, on-screen bar across the bottom of the screen. Because the pressure threshold for detecting the user's sliding the bar is relatively high, and because the user must drag it from one side of the screen to the other, it may take the user two or three attempts to get the device to recognize the finger movement, and to unlock the device.

By contrast, using the HDTP, an equivalent operation could be carried out using a much lighter touch, as the following examples illustrate. In order to prevent inadvertently unlocking the device, a particular kind of movement could be employed. For instance, a light yaw rotation could be used to unlock the device. Note that because the shape of the contact region, and how its orientation changes as a result of the yaw rotation, are very unlikely to occur unless the user is intentionally making the movement, it would be extremely unlikely that incidental contact would unlock the device. Thus, in this way, unlocking the device becomes much more effortless when an HDTP is used.

Partitioning

As mentioned earlier, a common strategy used to increase the number of operative dimensions of a touchscreen or other pointing device is to divide the surface of the touchscreen or other display into a number of discrete, spatially distinct partitions. The partitions can be generated dynamically, so that different screens are associated with different sets of partitions. By assigning a different function or operation to each partition, the number of operations made available to the user in any given screen could be substantially increased. For instance, in the startup screen of a smart phone, there are a number of icons. By touching a particular icon, the user launches a specific application.

In the case just described, the user's ability to translate the finger to one or another part of a screen or other control surface is utilized to make available a variety of operations without requiring the user to switch screens. Although it will in many circumstances be advantageous to allow the user to use different kinds of finger movements to vary continuous quantities or dimensions, the HDTP provides an additional way to extend the capabilities provided by spatial partitioning to other kinds of movements. For instance, the range of possible applied pressures could be partitioned into a plurality of smaller, distinct ranges; or the range of movements available in yawing the finger from left to right could be partitioned into a plurality of smaller, distinct ranges. Partitioning finger or hand movements in these ways could be exploited in a way analogous to how spatial partitioning is exploited to increase the number of operations made available to the user in a given screen.

An example of such partitioning was provided earlier in connection with the operation of tri-state controls. Another example was given earlier in connection with selecting one or another keyboard, where the extent of the pitch tilt determines which keyboard (e.g. letter, number, and symbol) is active. To give a third example, by dividing levels of pressure into ten discrete ranges, the user could choose a single numerical digit simply by increasing or decreasing the amount of downward pressure applied to a single small region of the screen, thus obviating the need to use surge and/or sway translation to select digits. (Note that when the amount of pressure associated with a given digit has been applied, the user could accept the digit using a light yaw rotation.) In a fourth example, in a calculator application, the user could select an operation to perform on two numbers by utilizing yaw rotation, with the entire comfortable range of possible yaw rotations divided into four partitions, one each for addition, subtraction, multiplication and division. Again, as in the example just given of using heave to select a digit and yaw to accept it, in this case the user could accept a given arithmetic operator by increasing the applied pressure beyond a certain threshold.

It will be clear to one or ordinary skill in the art that these same principles of partitioning could be applied to many other kinds of movements that can be discerned by the HDTP and many other kinds of operations.

Feedback

As is well known in the field of user interface design, providing feedback to the user is an important tool for making user interfaces more usable, and in many cases it is essential. In the case of the HDTP, such feedback comprises visual, auditory and tactile feedback. To give a simple example of how such feedback is provided on the smart phone when a user presses and releases a key of an on-screen, virtual keyboard, the character corresponding to the key appears on the screen, inserted in the text being entered. To give another example, when the user presses a key without releasing it, the character associated with the key is displayed above it, allowing the user to determine what character would be entered if her finger were lifted off the screen.

Such feedback could be utilized to improve the usability of a device that incorporates an HDTP. For instance, in the example described earlier in which the range of possible applied pressures is partitioned into ten smaller, discrete regions, one for each digit, the user's ability to select a given digit could be improved with appropriate feedback. An exemplary way to do this is to provide visual feedback analogous to the visual feedback used to improve the user's ability to select and accept a particular character using a virtual keyboard in the way just described. Another exemplary way to facilitate the user's ability to select a given digit is to provide tactile feedback, either in addition to or in place of visual feedback. For instance, as the boundary of a pressure partition between two digits is approached, the surface could be made to feel stiffer or to vibrate more than when the applied pressure lies further from the partition boundary. Techniques to provide such tactile feedback are well known to one of ordinary skill in the art, and include piezo-electric mechanisms and tactile displays. Another possibility is to provide audio feedback, such as a click marking the crossing of a pressure partition, or a tone that increases in pitch as a partition boundary is approached. Audio feedback too could supplement or replace visual and/or tactile feedback.

Timing of Movements

The time it takes to carry out a given movement could be taken into account in assigning a movement to an operation, so that the same movement could be assigned to different operations depending on how quickly it is carried out. For instance, in the example given earlier in which a roll movement is used to navigate across web pages, fast rolls and slower rolls could be assigned different meanings; for instance, a slow roll could be used to select each page in the sequence in turn, while a fast roll to the right selects the last page in the sequence and a fast roll to the left selects the first page in the sequence. Similarly, a sharp increase in pressure could have a different meaning from a gradual increase. For instance, in the example given earlier in which digits are selected by varying the amount of applied pressure, a sudden increase in pressure could repeat the last digit, and a sudden decrease could delete the last digit.

Applications for HDTPs Affixed to the Side or Rear of a Device

As mentioned earlier, a handheld device could have an HDTP not only on the main physical control surface, but on the sides of the device and/or the rear surface, either supplementing an HDTP on the main control surface or in place of it; in the extreme case, the entire device could be encased in an HDTP. A handheld device configured in this way has many possible applications, and there are many different ways it could be used. The following examples will illustrate some of the ways in which it could be used, but it will be apparent to one of ordinary skill in the art that the principles exemplified could be extended to cover many other cases.

In one exemplary use, the user can turn the phone on and off by gripping it in her hand and squeezing it. When used in this way, it could be advantageous to use a different operation for turning it on than is used for turning it off. In another exemplary use, when a call is received, the user can squeeze the phone to send the call to voicemail. If the operations just described of turning the phone on and off by squeezing it are also to be made available to the user, different operations could be assigned to different forms of contact. For instance, sending a call to voicemail could be assigned to squeezing the phone when only the sides are touched, while turning it on and off are assigned to pressing simultaneously on the front and rear surfaces, with, as before, one squeeze assigned to turning the phone on, and two to turning the phone off.

Note that to distinguish touching the phone with the intention of carrying out these operations from gripping it to hold it or carry it, or from touching it inadvertently, there is a variety of techniques that could be used. For example, to turn it on and off, the user could be required to pinch the device by pressing it simultaneously with the thumb and forefinger, with the thumb on the front surface and the forefinger on the rear. In a second example, those operations could be carried out in response to a particular kind of movement, such as a yaw or roll rotation, or by pressing a specific part of the phone, such as a corner. In a third example, patterns of squeezing unlikely to occur unless intentionally made by the user could be assigned to particular operations, such as requiring three squeezes of the sides of the phone in quick succession to turn it off.

In another exemplary use, HDTPs affixed to the sides or the rear of the phone. The enables the user to carry out certain operations by touching the HDTP in various patterns. For instance, the user could toggle between playing and pausing a song by touching once, fast forward by touching twice in quick succession, and so on. Such operations could be assigned to touching a particular part of the sides or rear surface of the device, particular temporal patterns of touches, and so on. If a particular part of the device must be touched to carry out these operations, the user's ability to touch the appropriate part of the device could be facilitated by providing raised surfaces or other markings that could be discerned by the user's sense of touch alone.

Yet another exemplary way that HDTPs affixed to the sides and/or rear of a device could be advantageously utilized is to facilitate the use of applications that the device provides. For example, when entering text, the user could select which keyboard (e.g. letter, number, symbol) is active by pressing the sides and/or rear of the phone—for instance, by pressing certain parts of the sides or rear surface or using certain kinds of movements (e.g. yaw, roll, pitch). In such an embodiment, it may be advantageous for the user to carry out one set of operations with one hand and another set with the other hand—for instance, the user could enter characters by pressing the keys of an on-screen, virtual keyboard with one hand, and select which keyboard is active with the other.

It should be noted that holding the device in one hand and operating the main control surface with the other could facilitate making certain kinds of movements. For example, if the user desires to make a yaw or roll movement with a finger of one hand, he could make a complementary movement holding the phone with the other—for instance, to facilitate making a yaw movement with a finger of one hand, he could rotate the phone in the opposite direction of the desired yaw movement with the other hand.

HDTPs affixed to the sides and/or rear of a device could also be used to carry out operations by tracing patterns on them with the hand or fingers. For instance, sliding a finger along one side, or tracing a circular pattern on the rear, could be used to adjust the volume of a song that is playing.

It will be apparent to one of ordinary skill in the art that these are just a few of many possible ways in which HDTPs affixed to other parts of a device besides the main control surface could be advantageously utilized.

Applications for Limited-Capability Hybrid Systems

Many of the exemplary applications described herein are suitable for handheld devices operated predominantly by means of a touchscreen or similar touch interface. However, the HDTP could advantageously be used in hybrid systems with limited capabilities, in which a small HDTP or HDTPs supplement other kinds of input controls, such as mechanical buttons. Although it will be clear to one of ordinary skill in the art that many of the applications described herein are suitable for limited-capability hybrid devices, or could be adapted for them, it is worth giving examples of ways in which the HDTP could advantageously be used to improve the operation of even handheld devices with limited capabilities.

In a first exemplary application, a small HDTP in a hybrid device, such as that shown in FIG. 7a, is used to emulate a navigation-selection control found in many handheld electronic devices, such as cell phones and remote controls. The control, shown in FIG. 35, consists of a selection key surrounded by four arrow keys. The arrow keys are used to navigate a two-dimensional array of choices, and the selection key to accept the current choice. This control could be replaced with a small HDTP, with the function of the arrow keys carried out by the pitch and roll tilts of the finger, and the selection function carried out by a heavier downward pressure.

In a second exemplary application, the number keys of a cell phone could each be equipped with an HDTP. Then, to compose a text message, the user could enter particular letters by placing her finger on the appropriate number key and tilting her finger left or right to scroll through the letters associated with the number key, and then applying a heavier pressure to select a letter.

Usage Scenarios

A number of ways in which HDTPs could advantageously augment the capabilities of a handheld device have been described. In this section some exemplary scenarios will be described which will provide further illustrations of the principles of the invention. It will be apparent to one of ordinary skill in the art that although specific details of the operation of an HDTP-equipped device will be presented, the principles of the invention provide for a large number of alternative modes of operation.

As a person is working, the alarm of his smart phone, set earlier using a clock application, goes off, reminding him to check his email and voicemail. He turns the alarm off by gripping the phone in his hand and squeezing it for a short interval of time. He then unlocks the phone by touching his index finger to the main control surface of the phone and making a slight yaw rotation. A fingerprint recognition facility incorporated in the phone authenticates the user, and the main desktop screen appears.

The user goes to the screen showing his voicemail messages by double-tapping an icon at the bottom of the screen, which he had previously assigned to the operation of viewing his voicemail. He scrolls through the list of messages by putting a finger on the screen and varying the pitch tilt, with the extent of the tilt determining the scrolling direction and rate. Seeing an old message that he has not yet viewed, he rolls his finger to the right to play the message. As the message is playing, he sets the volume to an appropriate level by varying the extent of the pitch tilt. Needing to repeat part of the message, he yaw rotates his finger to the left, which rewinds the message to an extent proportional to the extent of the yaw rotation. He then plays the message starting from the specified location in the message by rolling his finger to the right. Discovering he is not at the desired part of the message, he repeats the sequence of adjusting the yaw angle and rolling his finger right a couple of times, with the yaw angle determining the position within the message to start playing from and the roll initiating playback from that location. After a couple of tries, he finds the desired part of the message, and, as it plays back, varies the pitch tilt again to play it back at an appropriate volume.

After listening to the desired part of the message, he returns to the main screen, and taps the email icon to view his email messages. The list of mailboxes (each containing a number of messages) appears, which he scrolls through by varying the pitch of his finger. Finding the desired mailbox, he rolls his finger to the right to view the messages in the mailbox. He varies the pitch tilt of his finger to scroll through the list of messages, and, coming to a message he has not yet read, rolls his finger to the right to view it. Seeing that he needs to respond to the message, he taps once to bring up the on-screen, virtual keyboard. He types in the message by pressing and releasing keys corresponding to the desired characters. As he does so, he uses a combination of sliding movements and pitching and rolling to reach the desired keys. Entering the message requires that he switch among letter, number and symbol keyboards. He does so by varying the pitch of his finger and, simultaneously, increasing the downward pressure to exceed a threshold that distinguishes pitch movements used to select a keyboard from pitch movements used to select a key. Once he has switched to the desired keyboard, he reduces his pressure on the touchscreen, and the current keyboard remains active until he again uses a combination of a pitch tilt and increased pressure to change it. Realizing that some of the text he wants to enter occurs in an email he sent earlier, he performs a quick yaw rotation to the right to bookmark the current message and store the application state, so that when he returns the cursor marking the insertion point will be in the same location, and the currently active keyboard will be displayed.

He next returns to the list of mailboxes by rolling his finger to the left, once to ascend the menu hierarchy from the current message to the list of messages in the mailbox, and a second time to ascend to the list of mailboxes. Note that because the rolling movement was performed after the quick yaw rotation, the roll is interpreted as a command to ascend the menu hierarchy rather than to select a particular key of the current keyboard. Had he changed his mind after the yaw movement and decided to keep composing the current message, a second quick yaw movement would have canceled the effect of the first one, returning the system to the message composition mode.

Next he scrolls through the list of mailboxes, using pitch tilt, until he finds the appropriate one, and rolls his finger to the right to view the messages in the mailbox. He then uses pitch tilt to scroll through the messages, and rolls his finger to the right after finding the desired message to view it. He is now ready to copy the desired part of the message. He places his finger on the screen in the region of the text he wants to cut, and gradually increases the pressure to zoom in on the text to facilitate setting the cursor at the appropriate point. He then uses a combination of surge and sway to position the cursor more precisely. Once set, he momentarily increases the amount of pressure to switch to text select mode. He then rolls right to select the text. The text is selected word by word, and varying the extent of the roll rotation varies the rate at which words are selected. Note that it is only by rolling to the right that he advances the selection, since rolling to the left removes words from the selection, again word by word, and again with the rate at which words are removed from the selection determined by the extent of the roll.

Once the desired text has been selected, he momentarily increases the applied pressure to exit text selection mode and copy the current selection to a buffer. He then performs a quick yaw rotation to the right to return to the email message he had been composing. Note that a quick yaw rotation to the right returns him to the message he had bookmarked with that movement, and that, had he performed a quick yaw movement to the left, he would have returned to a message he had bookmarked using that movement earlier in the day, which he is still composing.

Having returned to the message he was most recently composing, he sets the text cursor in the same way as before, by placing his finger over the appropriate region of text, gradually increasing the pressure to zoom in on it, using a combination of surge and sway to refine the position, and momentarily increasing the pressure to set the cursor. A quick roll to the right then inserts the text from the buffer.

After finishing and sending the email message, the user brings up a web page in the browser. He uses a combination of pitch and roll to pan in order to see various parts of the page and increases or decreases downward pressure to adjust the zoom level. Desiring to return to a page he had viewed earlier, he switches to page navigation mode by moving his finger across the screen using a sway movement without appreciably rolling or pitching his finger. Once he does so, the current page is displayed on a considerably reduced scale, and the edges of the last page viewed appear to the left. He rolls his finger to the left to scroll to the left so the last page is centered in the display, and, at that point, he momentarily increases the pressure to return to page viewing mode.

Next he decides to view a link in the page. To do so, he uses a combination of pitch and roll to scroll to the region of the page that contains the link, and presses down to zoom in on the link. In this way, he is able to select the desired link rather than accidentally selecting another link close to it. A yaw rotation selects the link, and the corresponding page is displayed.

Remembering that he has an appointment later in the day at an unfamiliar location, the user launches the map application. He pans the map using a combination of pitch and roll, and adjusts the zoom level by varying the applied pressure. Realizing that he needs to view a map of a second location but will also need to view the first location again, he sets a bookmark to the current map as it is now displayed by making a quick yaw movement to the left of approximately 45 degrees. He then searches for the second location and displays it on the map. He then pans the map using a combination of pitch and roll, and adjusts the zoom level by varying the applied pressure.

At this point, he switches back and forth between the two maps. He does so by varying the yaw rotation: when the yaw angle is approximately 0 degrees, the pitch, roll and zoom movements all operate on the second map. But when the yaw angle is approximately 45 degrees to the left, as in the movement used to set the bookmark for the first map earlier, the first map is displayed, and pitch, roll and zoom operate on that map. Thus, when a yaw rotation of approximately 0 is combined with pitch, roll and heave movements, the last three movements carry out the corresponding operations on the second map; and when they are combined with a yaw rotation of approximately 45 degrees to the left, they carry out the corresponding operations on the second map. This provides a quick, efficient way to switch between viewing the first map and viewing the second.

The user's perusal of he maps is interrupted by a phone call. He makes three quick taps to save the state of the map application, and, after the call ends, returns to the map application by making three quick taps again.

After he is done perusing the maps, the use brings up the music player application. A list of playlists is displayed, and one song from one of the playlists is the currently selected song, which is paused. He navigates to the current song by rolling quickly to the right once to descend the menu hierarchy to the playlist that contains the current song, and a second time to navigate to the song. He taps the play button to resume playing the song, and adjusts the volume by varying the pitch tilt. Desiring to play a particular part of the song, he varies the yaw rotation of his finger, with a movement to the right advancing the song and a movement to the left rewinding it, and the speed of the advance or rewind corresponding to the extent of the yaw rotation. He then returns to the list of songs in the current playlist with one quick roll to the left, and to the list of playlists with a second quick roll to the left.

The user now decides to create a new playlist. To do so, he selects "New Playlist," an item that appears on the screen that displays the list of playlists, and then makes a quick yaw movement to the right. He looks through the songs on the device, going through various albums, artists and playlists. Each time he finds a song he wants to add to the new playlist, he does so by putting a finger on the title of the song displayed on the screen and making essentially the same quick yaw movement to the right he designated earlier when he initiated the creation of the playlist. When he has finished adding songs to the playlist, he returns to the screen with the list of playlists and taps the New Playlist menu item.

The user has now finished his current session with the smart phone. Wanting to create a reminder to check his email and voicemail at a later time, he uses a clock application to set an alarm. In the case of this application, he grips the phone in his right hand, with the thumb on the main control surface, and rolls the thumb to scroll through the range of numbers for the hour and a second range of numbers for the minutes, with the direction and rate of scrolling corresponding to the direction and extent of the roll. Note that in this case the thumb is oriented so it points in a direction parallel to the base of the device. Once the time has been specified, the user turns the alarm on by gripping the sides of the device and squeezing it twice in quick succession.

Additional Considerations

It should be noted that although many of the techniques described herein were described using a smart phone as an example, they could be advantageously applied to many other kinds of handheld devices, including simpler mobile phones, remote controls, and PDAs. It should also be noted that although many of the techniques described are particularly advantageous for operating HDTPs in handheld devices, the techniques could also be advantageously utilized to operate larger or other types of systems, such as laptop computers, workstations, household appliances, medical devices, gaming systems and automobiles. It should also be noted that although the primary focus of the discussion has been on movements made with a single finger, the HDTP could be advantageously used for multi-touch operation.

We claim:

1. A method for measuring the angle of roll of a finger in contact with a tactile sensor array by a processor, the method comprising:
   obtaining tactile array measurement data from the tactile sensor array, the tactile array measurement data comprising tactile array measurement values;
   processing the tactile array measurement data with at least one data array processing algorithm by the processor, resulting in processed tactile array measurement data;
   performing a first identification operation for identifying edge information of the processed tactile array measurement data, the edge information comprising at least one edge of a region of contact of the finger with the tactile sensor array, the first identification operation resulting in edge location data;
   performing a second identification operation by the processor for identifying a peak region of the processed tactile array measurement data, the peak region comprising a portion of the region of contact of the finger with the tactile sensor array having the highest tactile sensor measurement values of force within the region of contact, the second identification operation resulting in peak location data; and
   calculating a relative roll angle measurement of the finger, the calculation employing the edge location data and the peak location data, the calculation resulting in roll angle measurement data.

2. The method of claim 1 wherein the at least one data array processing algorithm comprises a thresholding operation employing a threshold value.

3. The method of claim 2 further comprises obtaining center of mass data for the region of contact of the finger with tactile array measurement values that exceed the threshold value.

4. The method of claim 3 wherein the calculation additionally employs the center of mass data.

5. The method of claim 3 wherein the calculation computes a difference between the center of mass data and the edge location data.

6. The method of claim 1 wherein the at least one data array processing algorithm comprises a rotation operation.

7. The method of claim 1 wherein the at least one data array processing algorithm comprises a center of mass operation.

* * * * *